US011161593B2

(12) United States Patent
Rolfes

(10) Patent No.: US 11,161,593 B2
(45) Date of Patent: Nov. 2, 2021

(54) T-TAIL JOINT ASSEMBLIES FOR AIRCRAFT

(71) Applicant: The Boeing Company, Chicago, IL (US)

(72) Inventor: Corey Adam Rolfes, Everett, WA (US)

(73) Assignee: The Boeing Company, Chicago, IL (US)

( * ) Notice: Subject to any disclaimer, the term of this patent is extended or adjusted under 35 U.S.C. 154(b) by 297 days.

(21) Appl. No.: 16/531,369

(22) Filed: Aug. 5, 2019

(65) Prior Publication Data

US 2021/0039768 A1 Feb. 11, 2021

(51) Int. Cl.
*B64C 9/02* (2006.01)
*B64C 5/02* (2006.01)
(Continued)

(52) U.S. Cl.
CPC .................. *B64C 9/02* (2013.01); *B64C 5/02* (2013.01); *B64C 5/06* (2013.01); *B64C 1/26* (2013.01)

(58) Field of Classification Search
CPC .... B64C 9/02; B64C 5/02; B64C 5/06; B64C 1/26; B64C 1/069
See application file for complete search history.

(56) References Cited

U.S. PATENT DOCUMENTS 2,384,409 A 9/1945 Michael
3,109,614 A 11/1963 Steidl
(Continued)

FOREIGN PATENT DOCUMENTS

CN 204279916 U 4/2015
GB 2533582 A * 6/2016 ............... B64C 3/26

OTHER PUBLICATIONS

European Search Report; Application EP20183584; dated Dec. 16, 2020.

*Primary Examiner* — Richard R. Green
*Assistant Examiner* — William L Gmoser
(74) *Attorney, Agent, or Firm* — Duft & Bornsen, PC

(57) ABSTRACT

A T-tail joint assembly is described that is used to mechanically couple a left and right horizontal stabilizer to a vertical stabilizer. In one embodiment, the T-tail joint assembly comprises a plurality of lower rib chord members, each having a first base member, a first fin projecting from a first surface of the first base member, notches in the first fin proximate to ends of the first base member, and attachment members projecting from a second surface of the first base member that opposes the first surface. The T-tail joint assembly further comprises a plurality of upper rib chord member, each having a second base member, a second fin projecting from a surface of the second base member, and notches in the second fin proximate to ends of the second base member. The T-tail joint assembly further comprises a plurality of spar fittings disposed between the upper rib chord members and the lower rib chord members, wherein the spar fittings engage the notches in the first fin of the lower rib chord members and the notches in the second fin of the upper rib chord members, and a plurality of spar chords coupled to and separating pairs of the upper rib chord members and the lower rib chord members, wherein the plurality of spar chords is proximate to ends of the first base member and the second base member.

20 Claims, 24 Drawing Sheets

(51) Int. Cl.
*B64C 5/06* (2006.01)
*B64C 1/26* (2006.01)

(56) References Cited

U.S. PATENT DOCUMENTS

| | | | |
|---|---|---|---|
| 3,417,946 A | 12/1968 | Hartley | |
| 5,096,142 A | 3/1992 | Rodriguez | |
| 2009/0065644 A1* | 3/2009 | Jacques | B29C 66/721 244/123.1 |
| 2009/0121082 A1* | 5/2009 | Godenzi | B64C 1/064 244/123.1 |
| 2010/0264271 A1* | 10/2010 | Cortes | B64C 1/26 244/131 |
| 2020/0247067 A1* | 8/2020 | Soula | B29C 70/48 |

* cited by examiner

T-TAIL JOINT ASSEMBLIES FOR AIRCRAFT

FIELD

This disclosure relates to the field of aircraft and, in particular, to aircraft that utilize T-tail empennage configurations.

BACKGROUND

A T-tail is an empennage configuration in which the horizontal stabilizer is mounted to the top of the vertical stabilizer. The T-tail configuration differs from the standard configuration in which the horizontal stabilizer is mounted to the fuselage at the base of the vertical stabilizer. As the horizontal stabilizer is kept out of the disturbed airflow behind the wings and fuselage, the T-tail empennage configuration may provide better pitch control due to the smoother airflow over the elevators. One problem with T-tail empennage configurations is that joining a multi-spar horizontal stabilizer with a multi-spar vertical stabilizer often creates solutions with less than efficient load paths, along with complicated assembly characteristics.

SUMMARY

A T-tail joint assembly is described that is used to mechanically couple a left and right horizontal stabilizer to a vertical stabilizer. The T-tail joint assembly includes a plurality of upper and lower cruciform rib chord members separated by spar fittings disposed between them. The spar fittings provide an efficient and continuous load path between the front and rear spars of the left and right horizontal stabilizer through a shear joint, and transmit loads between the center box ribs of the horizontal stabilizer and the vertical stabilizer. The cruciform lower rib chords allow an efficient continuous load path between the lower skins of the left and right horizontal stabilizer, while providing an efficient load path from the vertical stabilizer into the center box ribs of the horizontal stabilizer. A notch in the cruciform lower rib chord members provides a continuous load path through the cruciform spar fittings, while not compromising the shear load path.

One embodiment comprises a T-tail joint assembly for a T-tail empennage. The T-tail joint assembly comprises a plurality of lower rib chord members, each having a first base member, a first fin projecting from a first surface of the first base member, notches in the first fin proximate to ends of the first base member, and attachment members projecting from a second surface of the first base member that opposes the first surface. The T-tail joint assembly further comprises a plurality of upper rib chord members, each having a second base member, a second fin projecting from a surface of the second base member, and notches in the second fin proximate to ends of the second base member. The T-tail joint assembly further comprises a plurality of spar fittings disposed between the upper rib chord members and the lower rib chord members, where the spar fittings engage the notches in the first fin of the lower rib chord members and the notches in the second fin of the upper rib chord members. The T-tail joint assembly further comprises a plurality of spar chords coupled to and separating pairs of the upper rib chord members and the lower rib chord members, where the spar chords are proximate to the ends of the first base member and the second base member.

Another embodiment comprises a T-tail empennage. The T-tail empennage comprises a left horizontal stabilizer, a right horizontal stabilizer, a vertical stabilizer, and a T-tail joint assembly coupling the left horizontal stabilizer and the right horizontal stabilizer to the vertical stabilizer. The T-tail joint assembly comprises a first lower rib chord member proximate to a lower skin panel of the left horizontal stabilizer and a second lower rib chord member proximate to a lower skin panel of the right horizontal stabilizer, where each lower rib chord member comprises a first base member, a first fin projecting from a first surface of the first base member, notches in the first fin proximate to ends of the first base member, and attachment members projecting from a second surface of the first base member that oppose the first surface. The T-tai joint assembly further comprises a first upper rib chord member proximate to an upper skin panel of the left horizontal stabilizer, and a second upper rib chord member proximate to an upper skin panel of the right horizontal stabilizer, where each upper rib chord member comprises a second base member, a second fin projecting from a surface of the second base member, and notches in the second fin proximate to ends of the second base member. The T-tail joint assembly further comprises a plurality of spar fittings disposed between the first upper rib chord member and the first lower rib chord member, and disposed between the second upper rib chord member and the second lower rib chord member, where the spar fittings engage with the notches in the first fin of the first and second lower rib chord members and the notches in the second fin of the first and second upper rib chord members. The T-tail joint assembly further comprises a plurality of spar chords coupled to and separating the first and second upper rib chord members and the first and second lower rib chord members, where the spar chords are proximate to the ends of the first base member and the second base member. The T-tail joint assembly further comprises a plurality of couplers that couple to the attachment members in the first and second lower rib chord members and to at least one of spars in the vertical stabilizer and skin panels of the vertical stabilizer.

Another embodiment comprises a T-tail joint assembly for a T-tail empennage. The T-tail joint assembly comprises a plurality of lower rib chord members, each comprising a first base member, a first fin projecting from a first surface of the first base member, and attachment members projecting from a second surface of the first base member that opposes the first surface, a first lower fitting disposed on a first side of the first base member, the first lower fitting including a second fin proximate to the first fin and an attachment member proximate to the attachment members of the first base member, and a second lower fitting disposed on a second side of the first base member, the second lower fitting including a third fin proximate to the first fin and an attachment member proximate to the attachment members of the first base member. The T-tail joint assembly further comprises a plurality of upper rib chord member, each having a second base member, a fourth fin projecting from a surface of the second base member, and notches in the fourth fin proximate to ends of the second base member. The T-tail joint assembly further comprises a plurality of spar fittings disposed between the upper rib chord members and the lower rib chord members, the spar fittings engaged with the notches in the fourth fin of the upper rib chord members and engaged between the first fin and the second and third fin of the lower chord members. The T-tail joint assembly further comprises a plurality of spar chords coupled to and separating pairs of the upper rib chord members and the lower rib chord members, where the spar chords are proximate to the ends of the first base member and the second base member.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Common T-tail empennage configurations incorporate splice elements that reside between spar and skin elements of built up, (not monolithic) horizontal stabilizer and vertical stabilizer sub-assemblies. This type of joint would require machining away portions of a monolithic co-cured horizontal stabilizer or vertical stabilizer to accommodate the splice elements. Common empennage joint configurations incorporate separate splice elements for vertical shear loading that do not provide a vertical load path, common to a single fitting, through the entire thickness of a torque box. Existing solutions typically fall into two categories. The most common is for a trimmable horizontal stabilizer mounted on a vertical stabilizer where the rear spars are aligned at pivot fitting and the front spars are connected by the trim actuator. This concentrates the loads at the front and rear spars and results in a heavy joint. In another solution, existing fixed horizontal stabilizer configurations extend center box ribs forward to attach to a vertical stabilizer front spar. This interrupts the load path between the left and right horizontal stabilizers which must be provided through tension, which is less efficient. The embodiments represented herein describe a T-tail joint assembly that improves on the prior art and is used to mechanically couple a left and right horizontal stabilizer to a vertical stabilizer.

Figure 1:
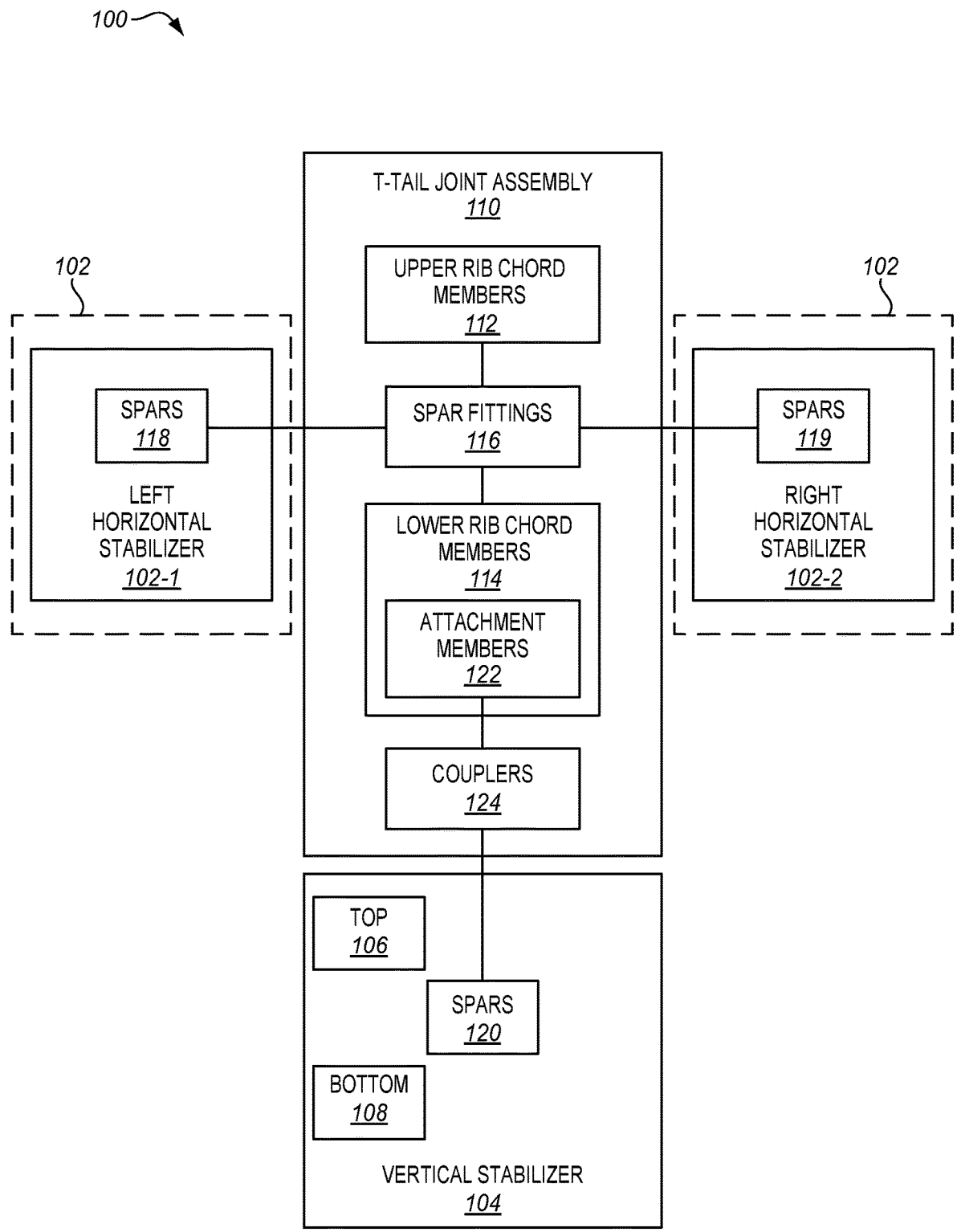
FIG. 1 is a block diagram of a T-tail empennage in an illustrative embodiment.

FIG. 1 is a block diagram of a T-tail empennage 100 in an illustrative embodiment. T-tail empennage 100 utilizes a horizontal stabilizer 102 and a vertical stabilizer 104 for longitudinal stability of an aircraft. T-tail empennage 100 is referred to as a T-tail configuration because horizontal stabilizer 102 is located at a top 106 of vertical stabilizer 104, with a bottom 108 of vertical stabilizer 104 coupled to a fuselage of the aircraft. In this embodiment, a T-tail joint assembly 110 includes upper rib chord members 112 and lower rib chord members 114. Upper rib chord members 112 and lower rib chord members 114 are separated from each other by spar fittings 116. Upper rib chord members 112 in this embodiment are proximate to major surfaces of an upper skin panel of horizontal stabilizer 102, while lower rib chord members 114 are proximate to major surfaces of a lower skin panel of horizontal stabilizer 102. In some embodiments, upper rib chord members 112 and/or lower rib chord members 114 have a cruciform shape.

Horizontal stabilizer 102 in this embodiment comprises two separate pieces (i.e., a left horizontal stabilizer 102-1 and a right horizontal stabilizer 102-2) that are attached to T-tail joint assembly 110 to collectively form horizontal stabilizer 102. Horizontal stabilizer 102 further includes spars 118-119. In this embodiment, left horizontal stabilizer 102-1 includes spars 118, and right horizontal stabilizer 102-2 includes spars 119. Generally, spars 118-119 are the main structural components of horizontal stabilizer 102, and run spanwise in horizontal stabilizer 102. During assembly of T-tail empennage 100, spars 118-119 of horizontal stabilizer 102 are mechanically coupled (e.g., via fasteners) to spar fittings 116 of T-tail joint assembly 110 when horizontal stabilizer 102 is joined to T-tail joint assembly 110.

Vertical stabilizer 104 further includes spars 120, which run spanwise in vertical stabilizer 104 and form the main structural components of vertical stabilizer 104. To attach T-tail joint assembly 110 to vertical stabilizer 104, couplers 124 are attached to spars 120 in vertical stabilizer 104, and couplers 124 are attached to attachment members 122 in lower rib chord members 114 of T-tail joint assembly 110.

In one embodiment, attachment members 122 and couplers 124 comprise lugs and clevis fittings, respectively, which are collectively referred to as clevis joints. In other embodiments, attachment members 122 and couplers 124 comprise continuous sheer joints and/or tension fitting joints. The use of clevis joints for attachment members 122 and couplers 124 will be more readily apparent with respect to the discussion of FIG. 2.

Figure 2:
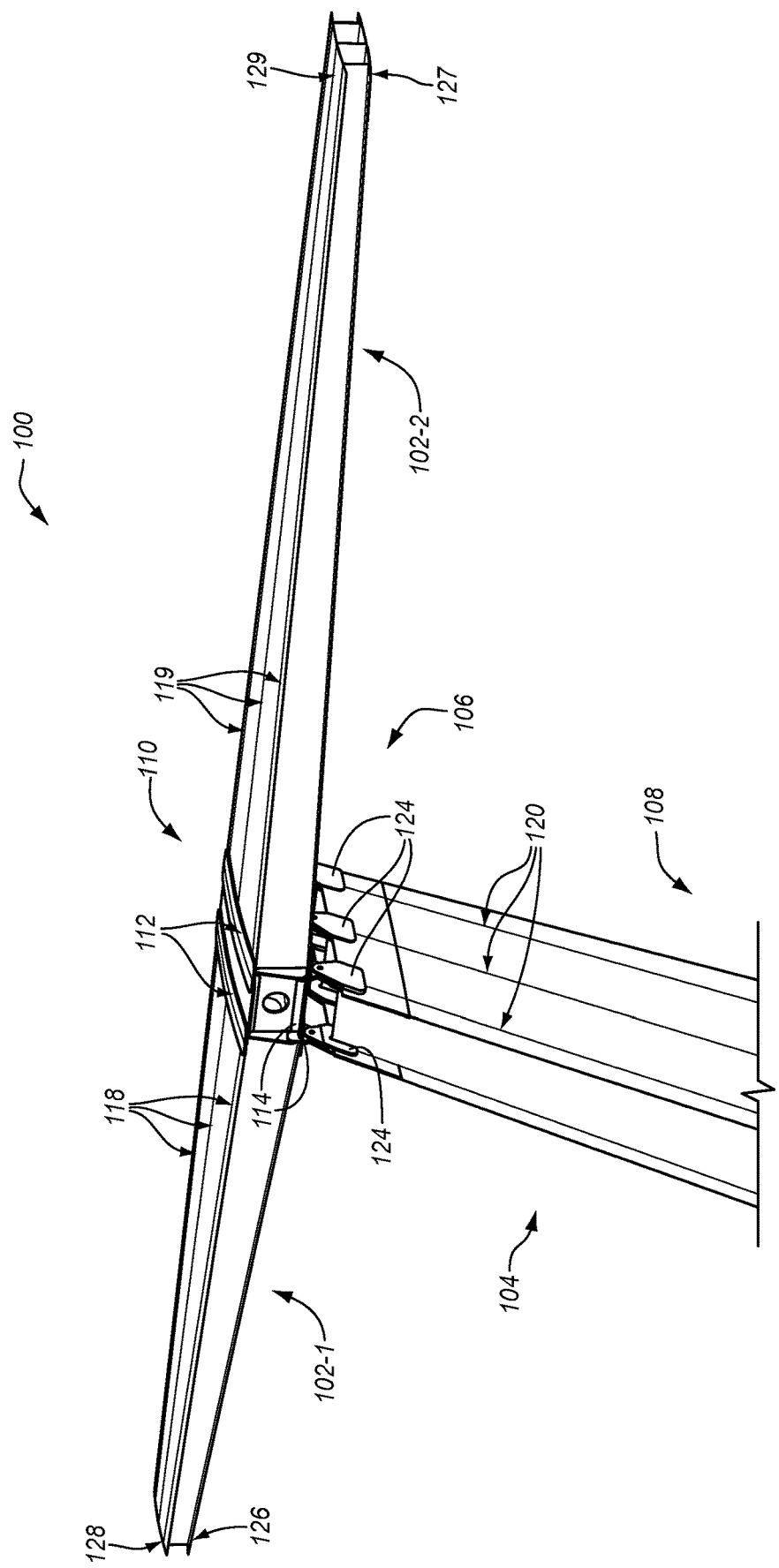
FIG. 2 depicts a T-tail empennage in another illustrative embodiment.

FIG. 2 depicts T-tail empennage 100 in another illustrative embodiment. In this embodiment, left horizontal stabilizer 102-1 includes three spars 118, right horizontal stabilizer 102-2 includes three spars 119, and vertical stabilizer 104 includes three spars 120. In other embodiments, horizontal stabilizer 102 and/or vertical stabilizer 104 include more or fewer spars 118-119, and 120, respectively. In this embodiment, T-tail joint assembly 110 includes two upper rib chord members 112 and two lower rib chord members 114, although in other embodiments T-tail joint assembly 110 includes more or fewer upper rib chord members 112 and/or lower rib chord members 114.

In this embodiment, T-tail joint assembly 110 couples to vertical stabilizer 104 using three pairs of couplers 124; one pair for each spar 120 in vertical stabilizer 104. In other embodiments, T-tail joint assembly 110 couples to vertical stabilizer 104 using more or fewer couplers 124. In this embodiment, couplers 124 comprise two plate clevis fittings, and attachment members 122 (not evident in this view) comprise lugs. However, the concepts described herein also apply to other types of couplers 124 and/or attachment members 122.

As discussed previously, upper rib chord members 112 are substantially proximate to major surfaces of upper skin panels 128-129 of horizontal stabilizer 102, and lower rib chord members 114 are substantially proximate to major surfaces of lower skin panels 126-127 of horizontal stabilizer 102.

Figure 3:
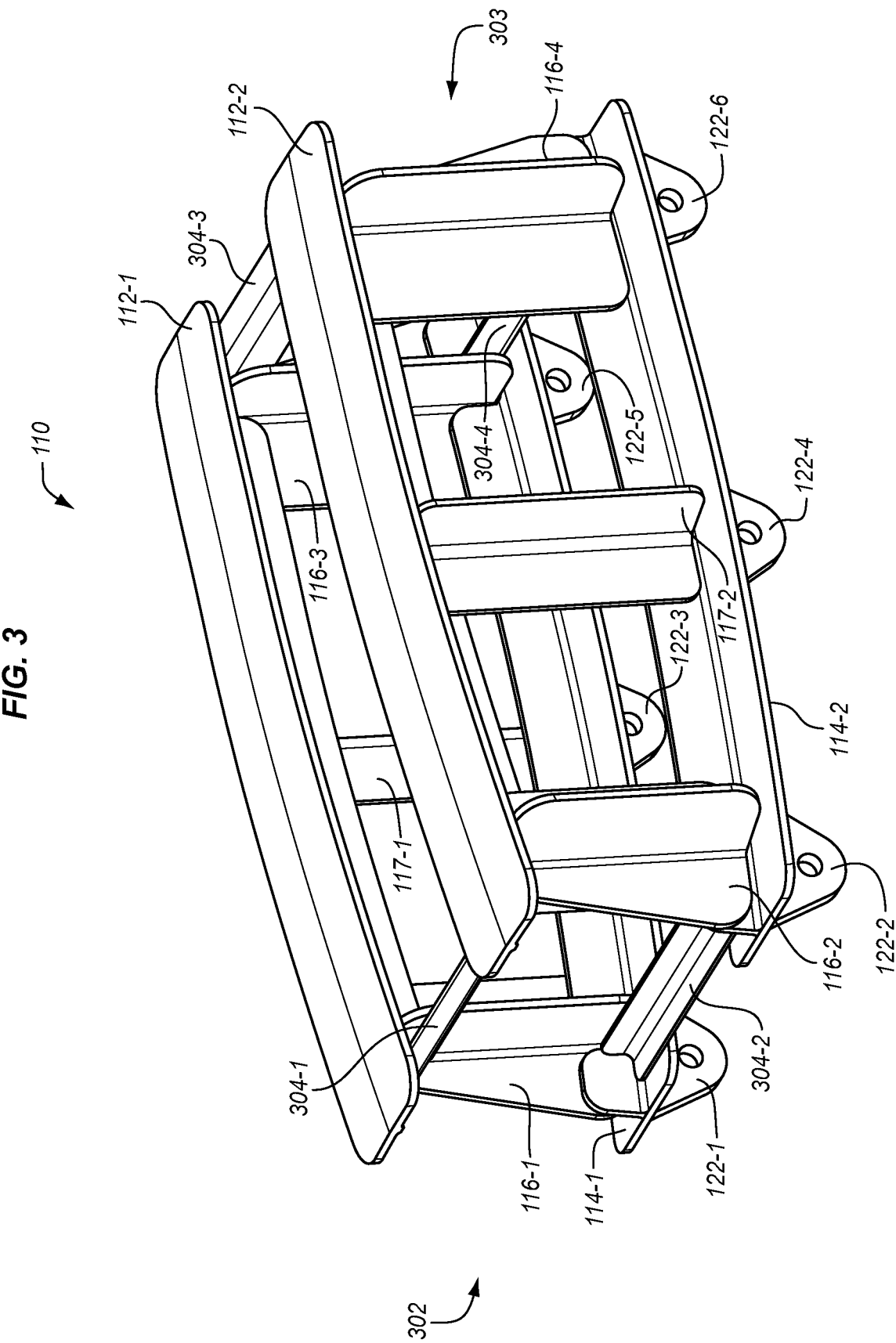
FIG. 3 illustrates an isometric view of the T-tail joint assembly of FIG. 2 in an illustrative embodiment.

FIG. 3 illustrates an isometric view of T-tail joint assembly 110 of FIG. 2 in an illustrative embodiment. In this view of T-tail joint assembly 110, a number of elements that make up T-tail joint assembly 110 are more readily visible. In this embodiment, T-tail joint assembly 110 includes a pair of upper rib chord members 112 (i.e., upper rib chord member 112-1 and upper rib chord member 112-2) separated by spar chords 304 (i.e., spar chord 304-3 and spar chord 304-4) and a pair of lower rib chord members 114 (i.e., lower rib chord member 114-1 and lower rib chord member 114-2) separated by spar chords 304 (i.e., spar chord 304-1 and spar chord 304-2). Further in this embodiment, T-tail joint assembly 110 includes spar fittings 116 (e.g., spar fittings 116-1 to 116-4) between upper rib chord members 112 and lower rib chord members 114, and mid spar shear ties 117 (i.e., mid spar shear tie 117-1 and mid spar shear tie 117-2) between upper rib chord members 112 and lower rib chord members 114. In some embodiments, spar fittings 116 and mid spar shear ties 117 comprise metal, composite materials, or combinations of metal and composite materials. Further, mid spar shear ties 117 may be eliminated in some embodiments. Spar fitting 116-1 and 116-2 may be referred to as front spar fittings, while spar fitting 116-3 and spar fitting 116-4 may be referred to as rear spar fittings.

Spar fitting 116-1 and spar fitting 116-2 are located proximate to end 302 of T-tail joint assembly 110, and spar fitting 116-3 and spar fitting 116-4 are located proximate to end 303 of T-tail joint assembly 110. Mid spar shear tie 117-1 and mid spar shear tie 117-2 are located between ends 302-303. In this embodiment, mid spar shear ties 117 form an angle bend, while spar fittings 116 form a more cruciform shape.

In this embodiment, attachment members 122 in lower rib chord members 114 are illustrated as lugs, and the embodiment illustrated in FIG. 3 may be referred to as a 6-lug design. Attachment member 122-1 and attachment member 122-2 are located on lower rib chord members 114 proximate to end 302, attachment member 122-3 and attachment member 122-4 are located on lower rib chord members 114 between ends 302-303, and attachment members 122-5 and attachment member 122-6 are located on lower rib chord members 114 proximate to end 303. As discussed previously, each of attachment members 122 mates with one of couplers 124 (see FIG. 3) to attach vertical stabilizer 104 to T-tail joint assembly 110.

Figure 4:
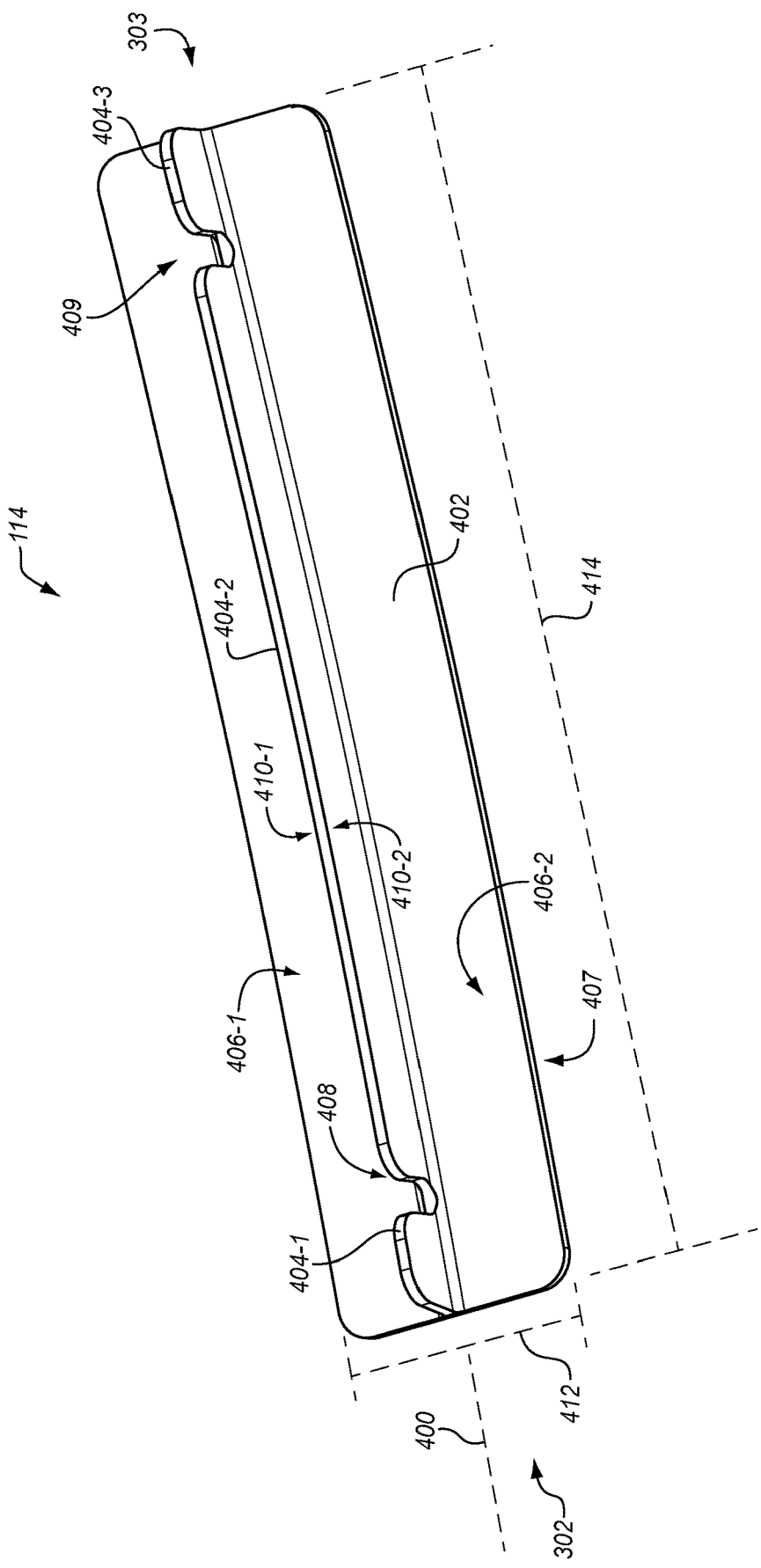
FIGS. 4-5 depict isometric views of a lower rib chord member of the T-tail joint assembly of FIG. 2 rotated about an axis in an illustrative embodiment.
Figure 5:
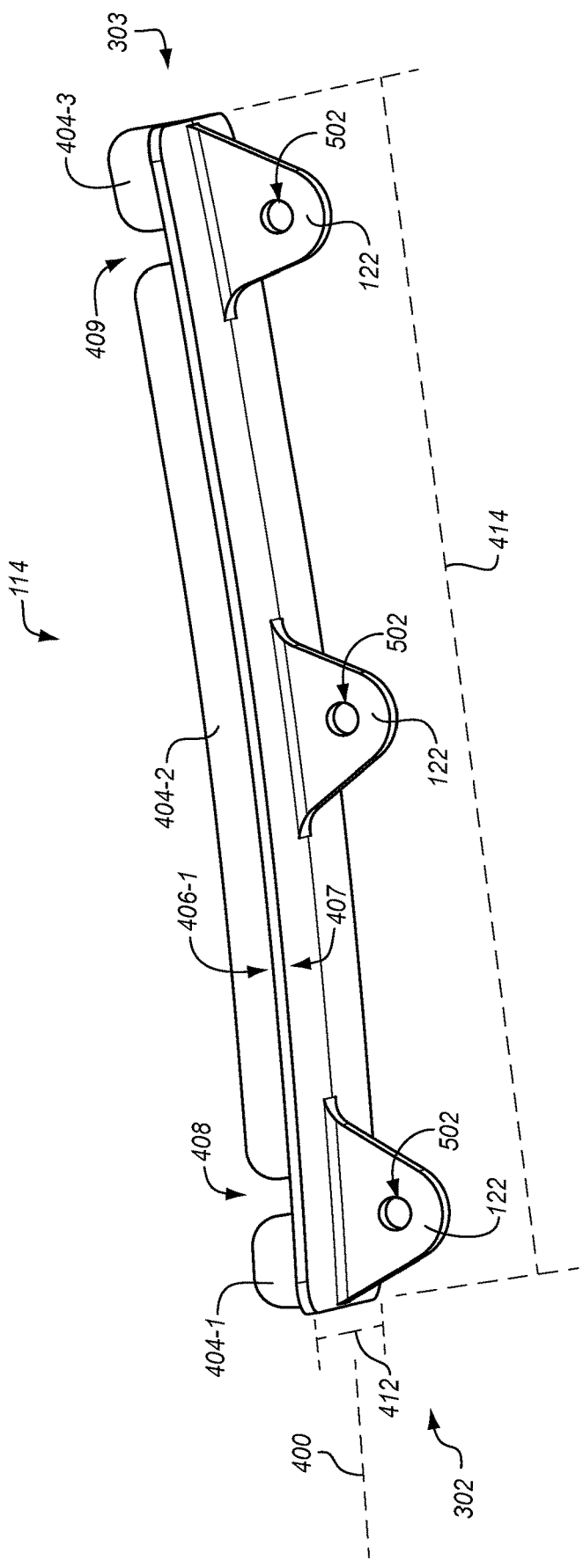

FIGS. 4-5 depict isometric views of lower rib chord member 114 rotated about axis 400 in an illustrative embodiment. In this embodiment, lower rib chord member 114 includes an elongated base member 402 and a fin 404 (i.e., fins 404-1 and fin 404-2) projecting away from surfaces 406 (i.e., surface 406-1 and surface 406-2) of base member 402. Fin 404 in this embodiment is substantially centered with respect to a width 412 of base member 402, and extends along a length 414 of base member 402. The major surfaces 410 of fin 404 (i.e., surface 410-1 and surface 410-2) may form a substantially ninety-degree angle with surface 406 of base member 402. In opposition to surface 406 is surface 407, which is proximate to lower skin panels 126-127 (see FIG. 3). Projecting from surface 406 are attachment members 122. Attachment members 122 in this embodiment include a hole 502 that is used to secure T-tail joint assembly 110 to vertical stabilizer 104 using couplers 124. Further, attachment members 122 are vertically aligned with fin 404 in this embodiment (e.g., attachment members 122 are substantially centered with respect to width 412 of base member 402. Notches 408 are located in fin 404 proximate to ends 302-303, and are used to capture spar fittings 116 (see FIG. 3). Notches 408 are partial or full recesses in fin 404 that project from surface 406 through fin 404.

Figure 6:
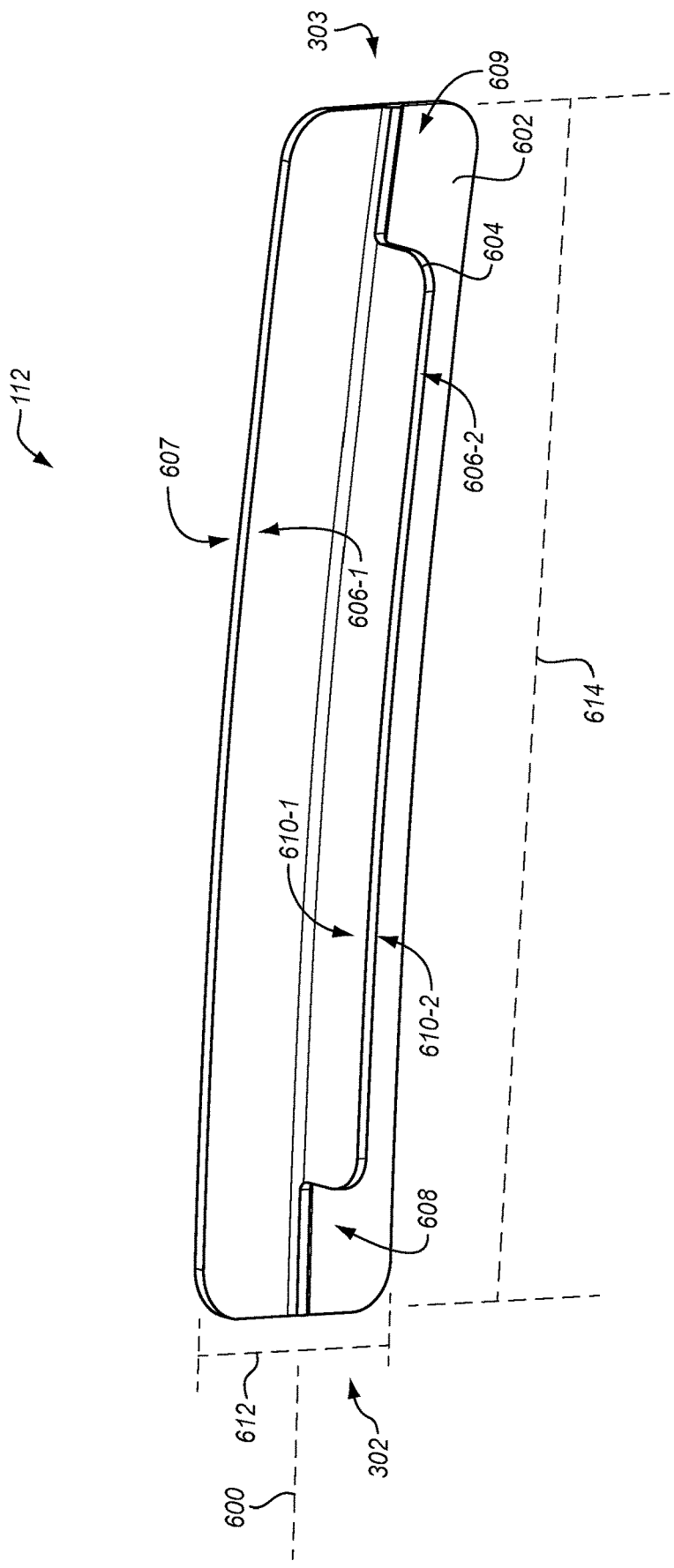
FIGS. 6-7 depict isometric views of an upper rib chord member of the T-tail joint assembly of FIG. 2 rotated about an axis in an illustrative embodiment.
Figure 7:
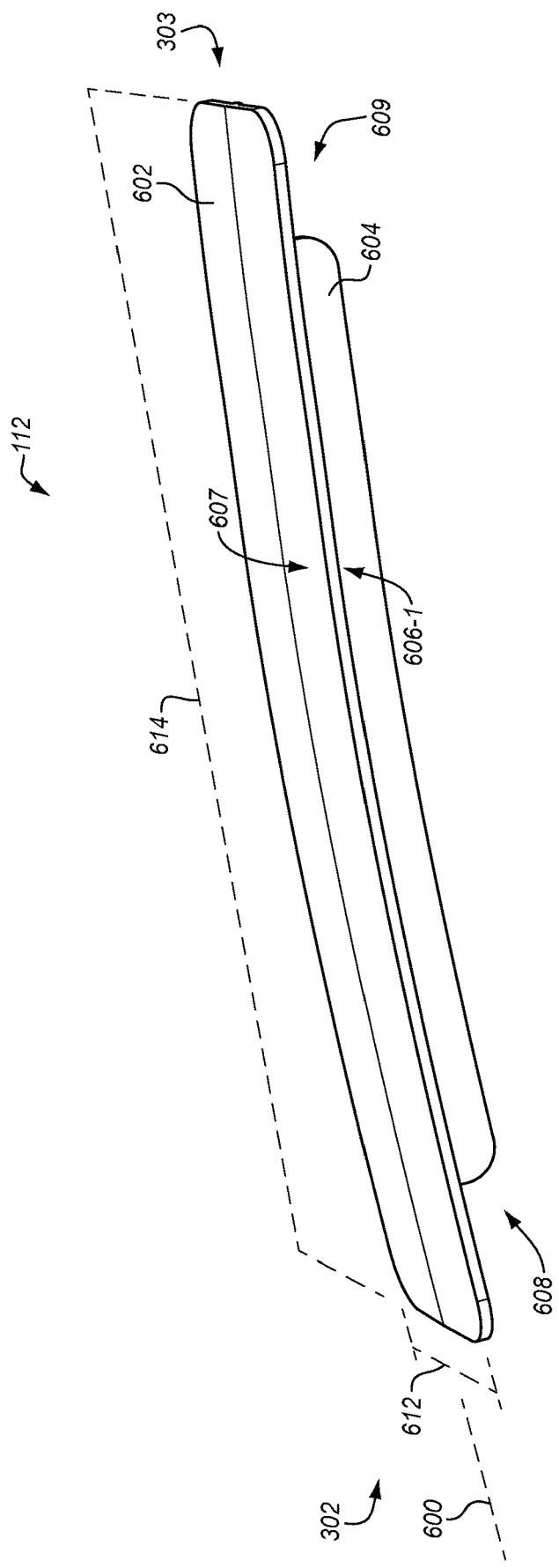

FIGS. 6-7 depict isometric views of upper rib chord member 112 rotated about axis 600 in an illustrative embodiment. In this embodiment, upper rib chord member 112 includes an elongated base member 602 and a fin 604 projecting from a surface 606 (i.e., surface 606-1 and surface 606-2) of base member 602. Fin 604 in this embodiment is substantially centered with respect to a width 612 of base member 602, and extends along a length 614 of base member 602. The major surfaces 610 of fin 604 (i.e., surface 610-1 and surface 610-2) may form a substantially ninety-degree angle with surface 606 of base member 602. In opposition to surface 406 is surface 607, which is proximate to upper skin panels 128-129 of horizontal stabilizer 102 (see FIG. 3). Notches 608-609 are located in fin 604, and are used to capture spar fittings 116 (see FIG. 3). Notches 608-609 are partial or full recesses in fin 404 that project from surface 406 through fin 604 and are disposed proximate to ends 302-303.

Figure 8:
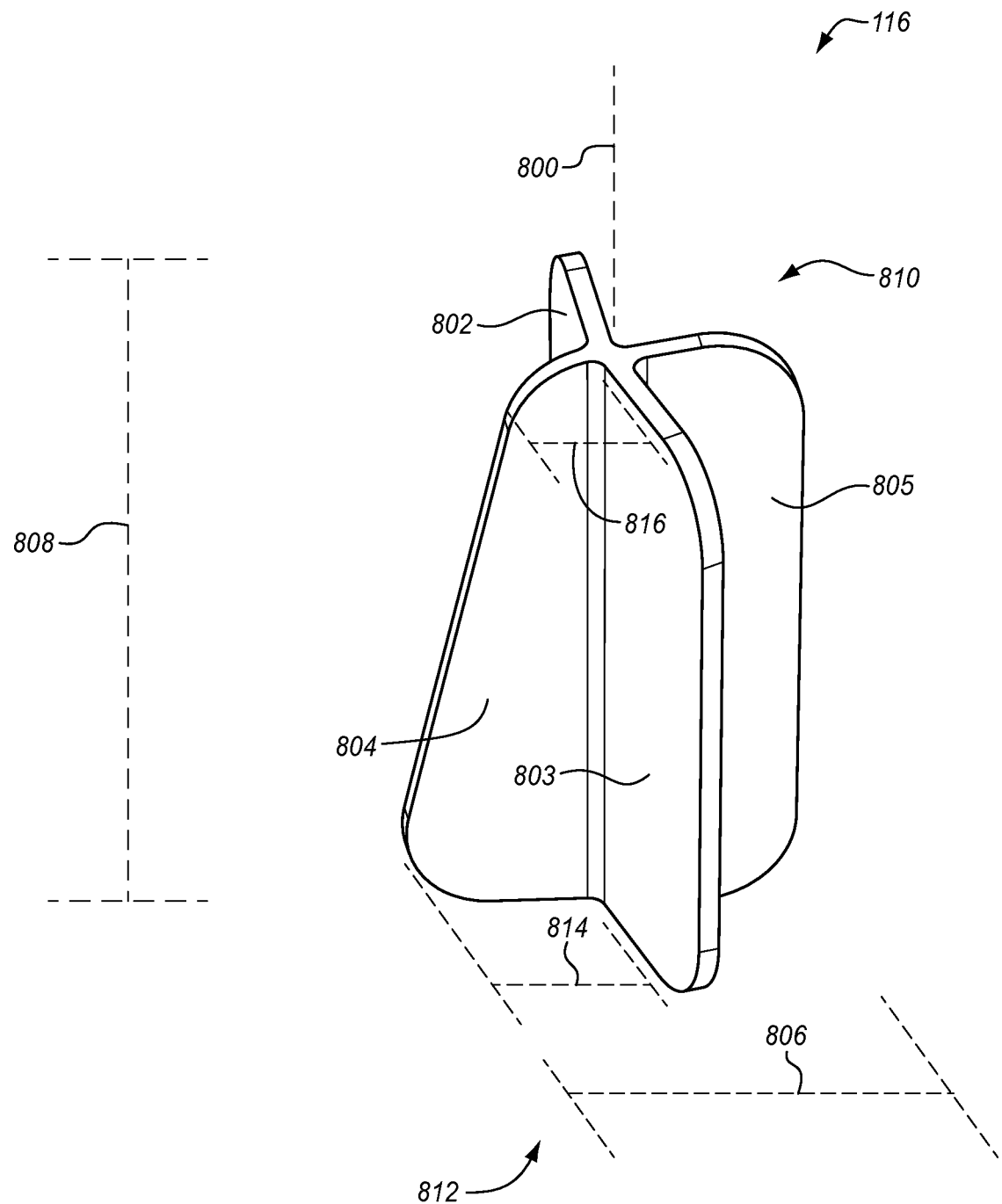
FIG. 8-9 depict isometric views of a spar fitting of the T-tail joint assembly of FIG. 2 rotated about an axis in an illustrative embodiment.
Figure 9:
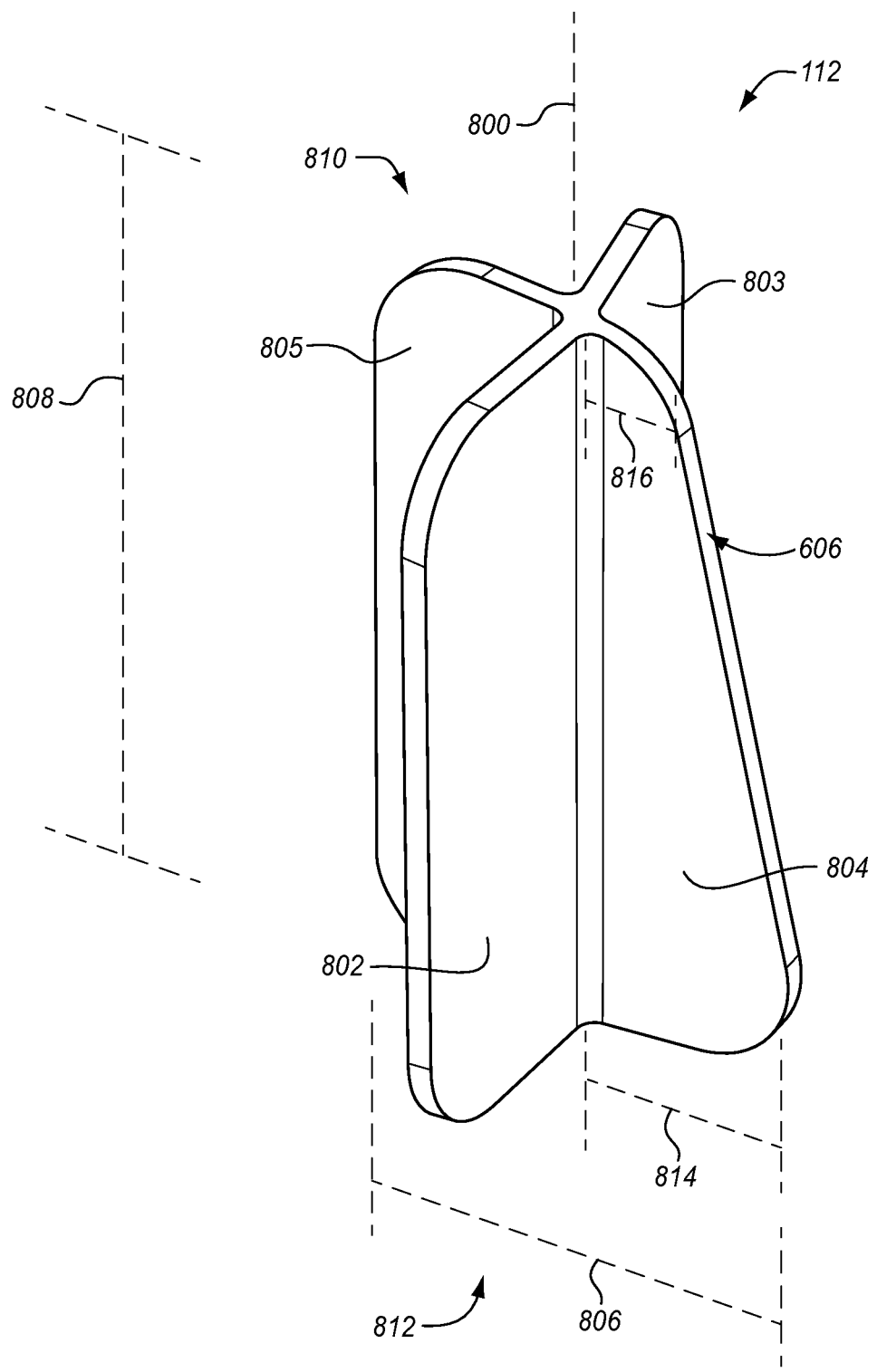

FIG. 8-9 depict isometric views of spar fitting 116 rotated about axis 800 in an illustrative embodiment. In this embodiment, spar fitting 116 has a cruciform shape with a length 808 and a width 806, and includes four planar members 802-805 that radiate away from each other. Planar members 802-803 are substantially similar, and have major surfaces that lie in substantially the same plane through axis 800. Further, planar member 802-803 are configured to mount to spars 118-119 in horizontal stabilizer 102. Planar members 804-805 also have major surface that lie in substantially the same plane through axis 800, but rotated ninety degrees with respect to planar members 802-803. In this embodiment, planar members 802-803 and planar member 805 are substantially similar in shape, with planar member 804 being different in shape than planar members 802-803 and planar member 805. In this embodiment, planar member 804 has a width 814 proximate to a bottom 812 of spar fitting 116 that is greater than a width 816 proximate to a top 810 of spar fitting 116. As evident in FIG. 3, top 810 of spar fitting 116 is proximate to upper rib chord member 112, and bottom 812 of spar fitting is proximate to lower rib chord member 114, when T-tail joint assembly 110 is assembled.

Figure 10:
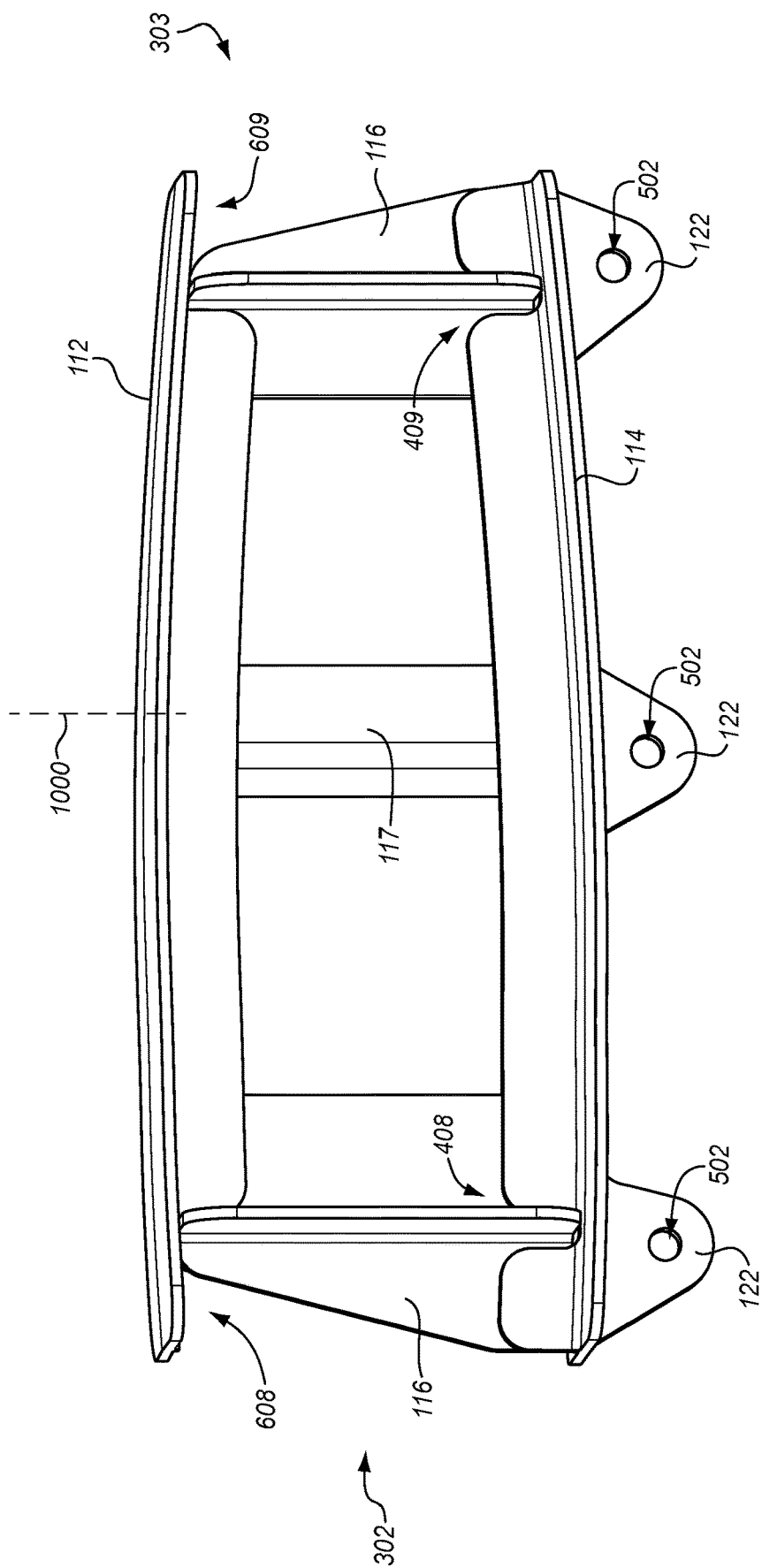
FIGS. 10-12 depict isometric views of the upper rib chord member, the lower rib chord member, the spar fittings, and mid spar shear ties rotated about an axis in an illustrative embodiment.
Figure 11:
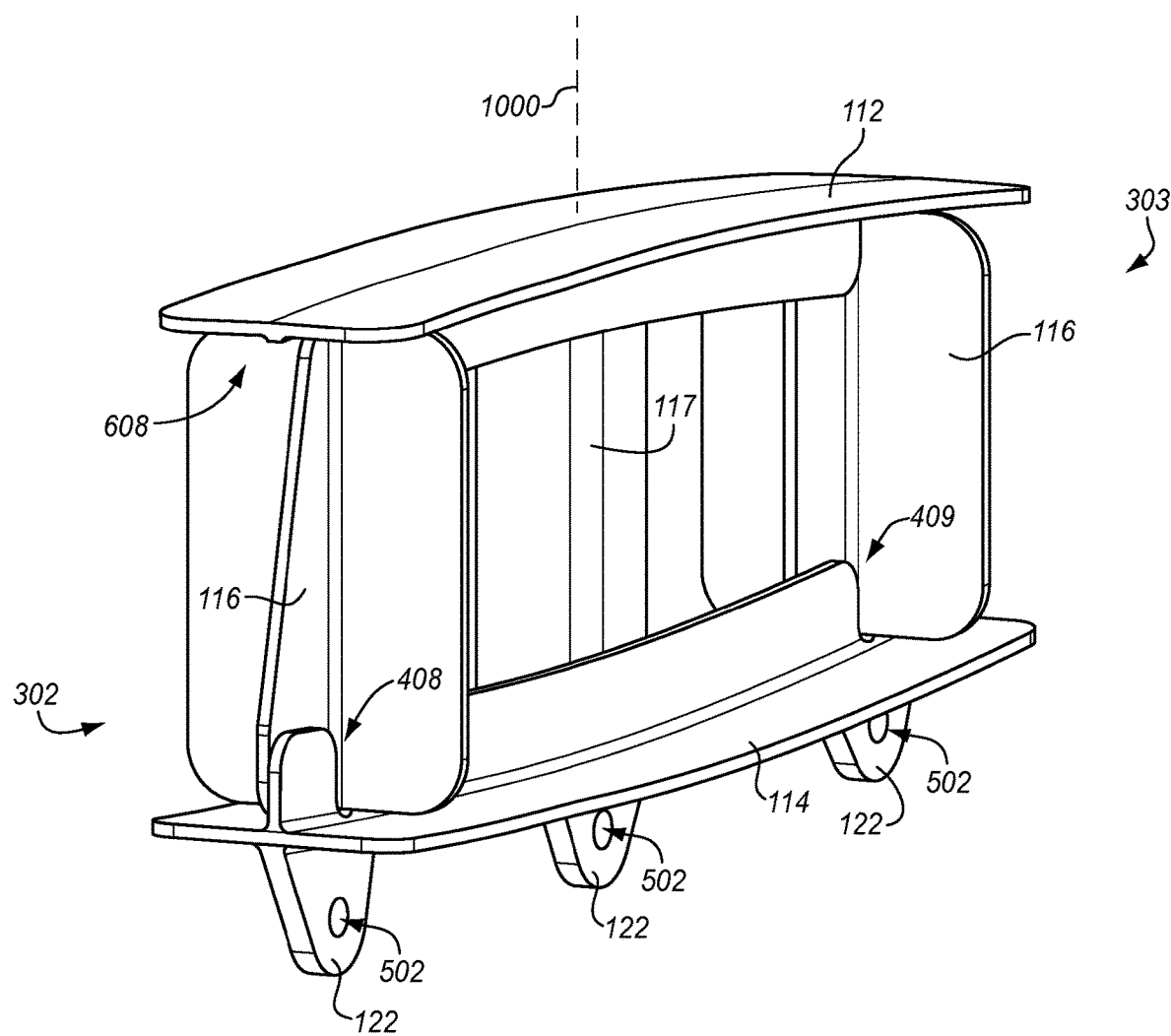
Figure 12:
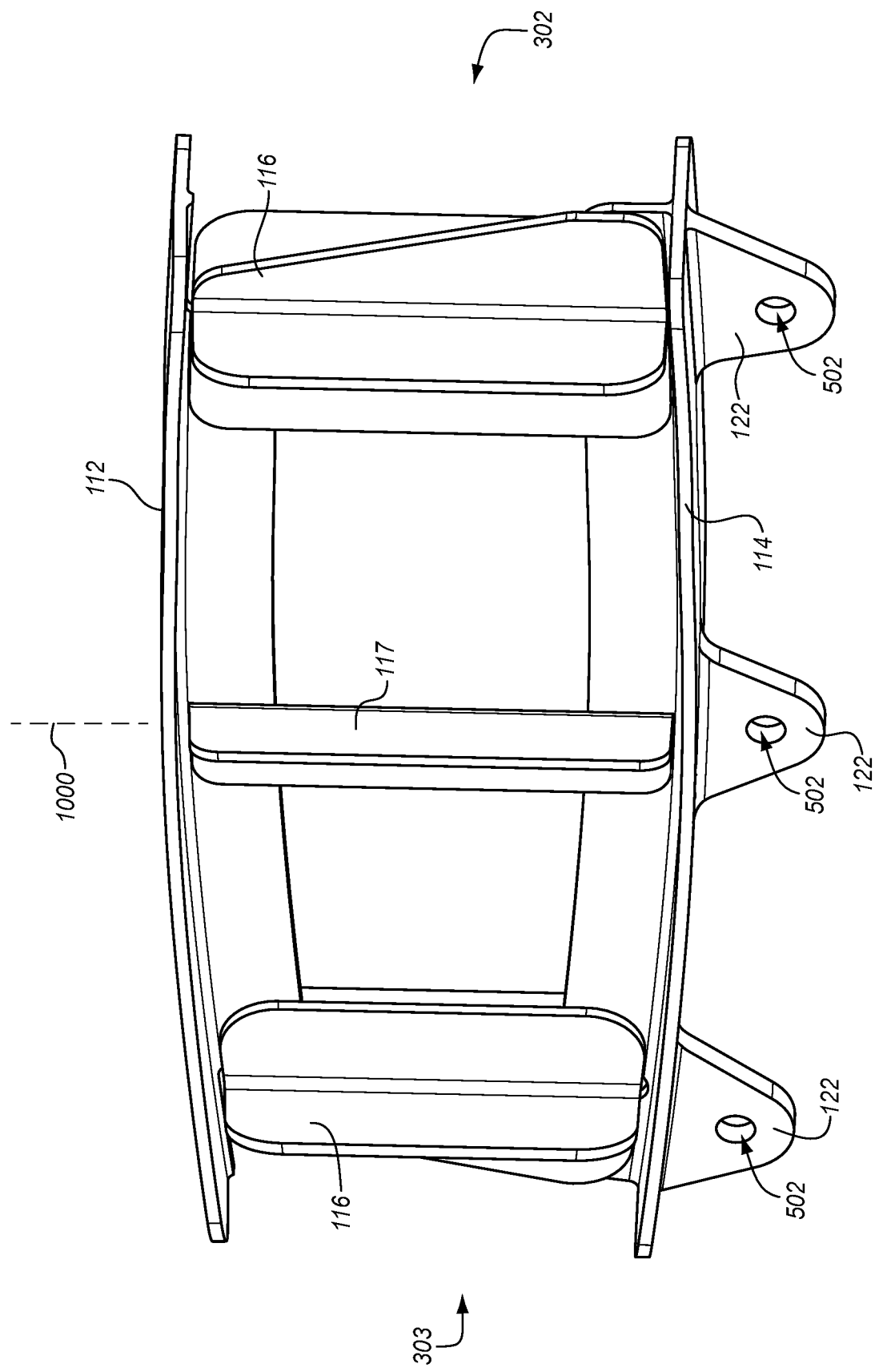

FIGS. 10-12 depict isometric views of upper rib chord member 112, lower rib chord member 114, spar fittings 116, and mid spar shear ties 117 rotated about axis 1000 in an illustrative embodiment. In these views, spar fittings 116 are captured by notches 608-609 of upper rib chord member 112, and notches 408-409 of lower rib chord member 114.

Figure 13:
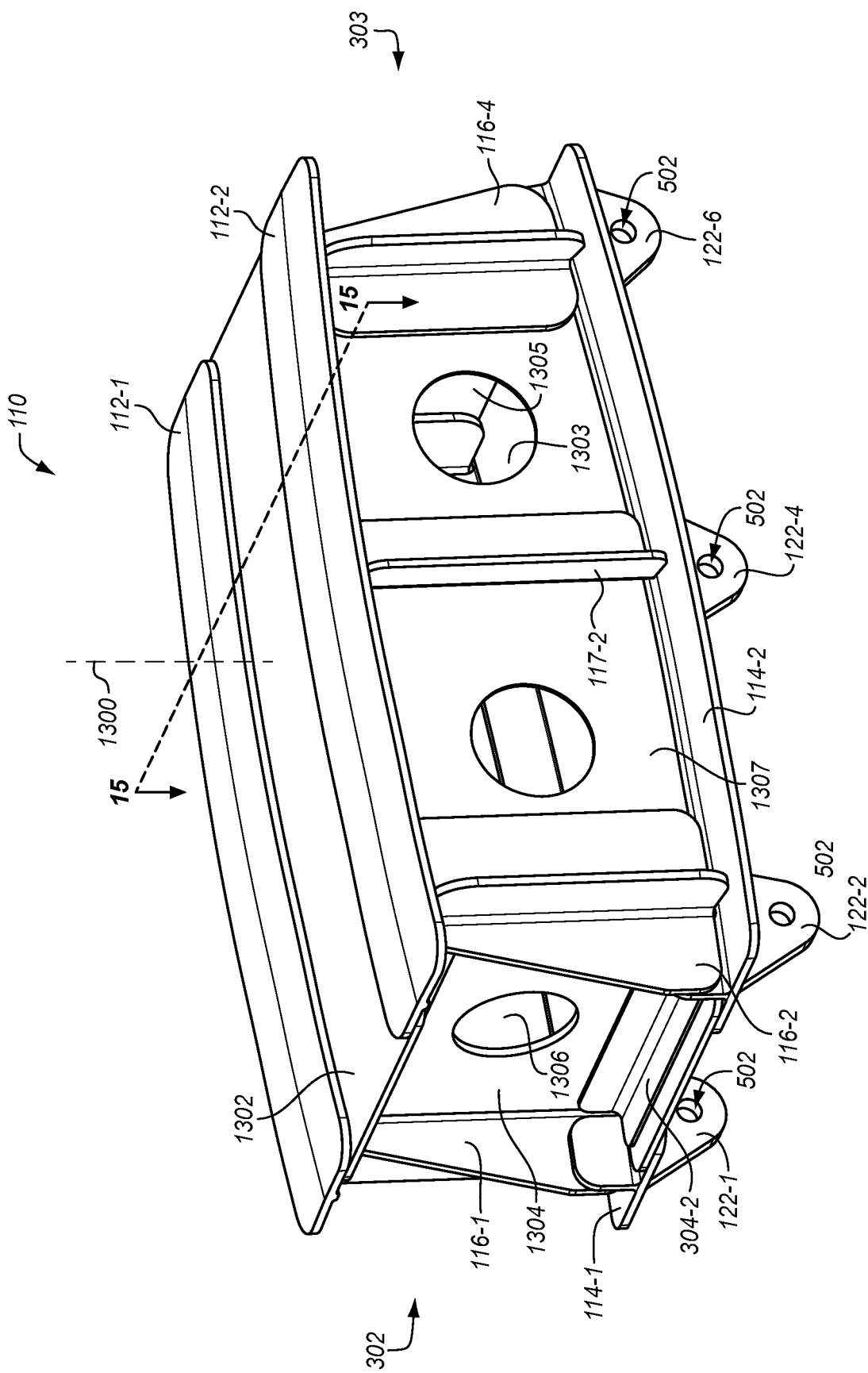
FIGS. 13-14 depict isometric views of the T-tail joint assembly of FIG. 2 rotated about an axis in another illustrative embodiment.
Figure 14:
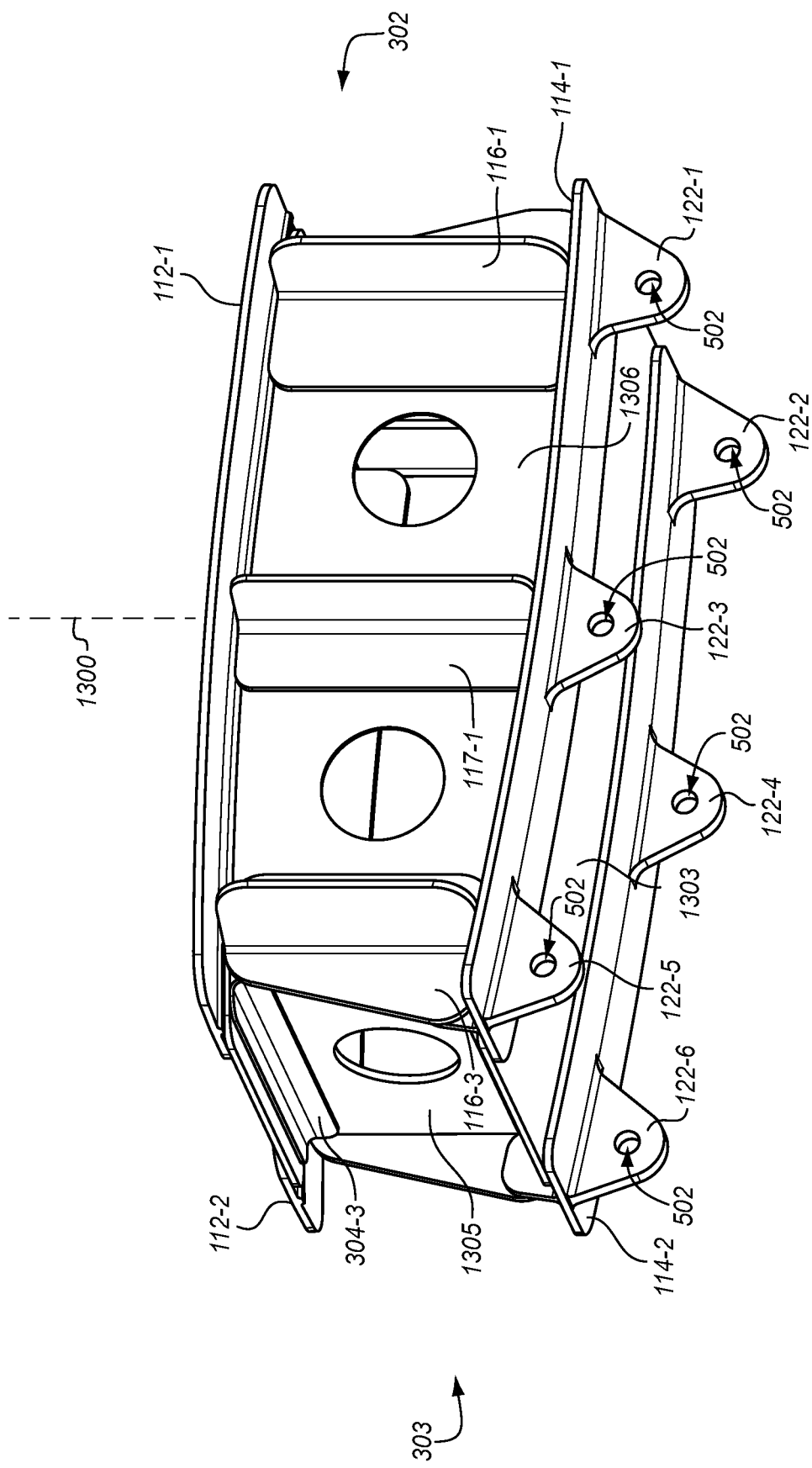

FIGS. 13-14 depict isometric views of T-tail joint assembly 110 rotated about axis 1300 in another illustrative embodiment. In this embodiment, T-tail joint assembly 110 includes 1302-1307 formed from composite and/or metal, which provide additional structural rigidity to T-tail joint assembly 110. Collectively, panels 1302-1307 comprise a center box or torque box for T-tail joint assembly 110, transmitting loads between horizontal stabilizer 102 and vertical stabilizer 104 in conjunction with upper rib chord members 112, lower rib chord members 114, spar fittings 116, mid spar shear ties 117, and spar chords 304.

Referring again to FIG. 13, an upper panel 1302 disposed between surface 606-1 or surface 606-2 of upper rib chord members 112 (see FIG. 6) and top 810 of spar fittings 116 (see FIG. 8), and is proximate to upper skin panels 128-129 of horizontal stabilizer 102 in T-tail empennage 100 (see FIG. 2). A lower panel 1303 is disposed between surface 406-1 or surface 406-2 of lower rib chord members 114 (see FIG. 4) and bottom 812 of spar fittings 116 (see FIG. 8), and is proximate to lower skin panels 126-127 of horizontal stabilizer 102 in T-tail empennage 100 (see FIG. 2). A front spar web 1304 is disposed between planar member 802 or planar member 803 of spar fittings 116 (see FIG. 8), spar chord 304-1, and spar chord 304-2 (see FIG. 3).

A rear spar web 1305 is disposed between planar member 802 or planar member 803 of spar fittings 116 (see FIG. 8), spar chord 304-3, and spar chord 304-2 (see FIG. 3). Rib webs 1306-1307 are disposed between planar member 805 of spar fittings 116 (see FIG. 8), surface 410-1 or surface 410-2 of fin 404 of lower rib chord members 114, and surface 610-1 or surface 610-2 of upper rib chord members 112. Rib web 1306 is proximate to left portion of horizontal stabilizer 102-1 in T-tail empennage 100, and rib web 1307 is proximate to right portion of horizontal stabilizer 102-1 in T-tail empennage 100.

Figure 15:
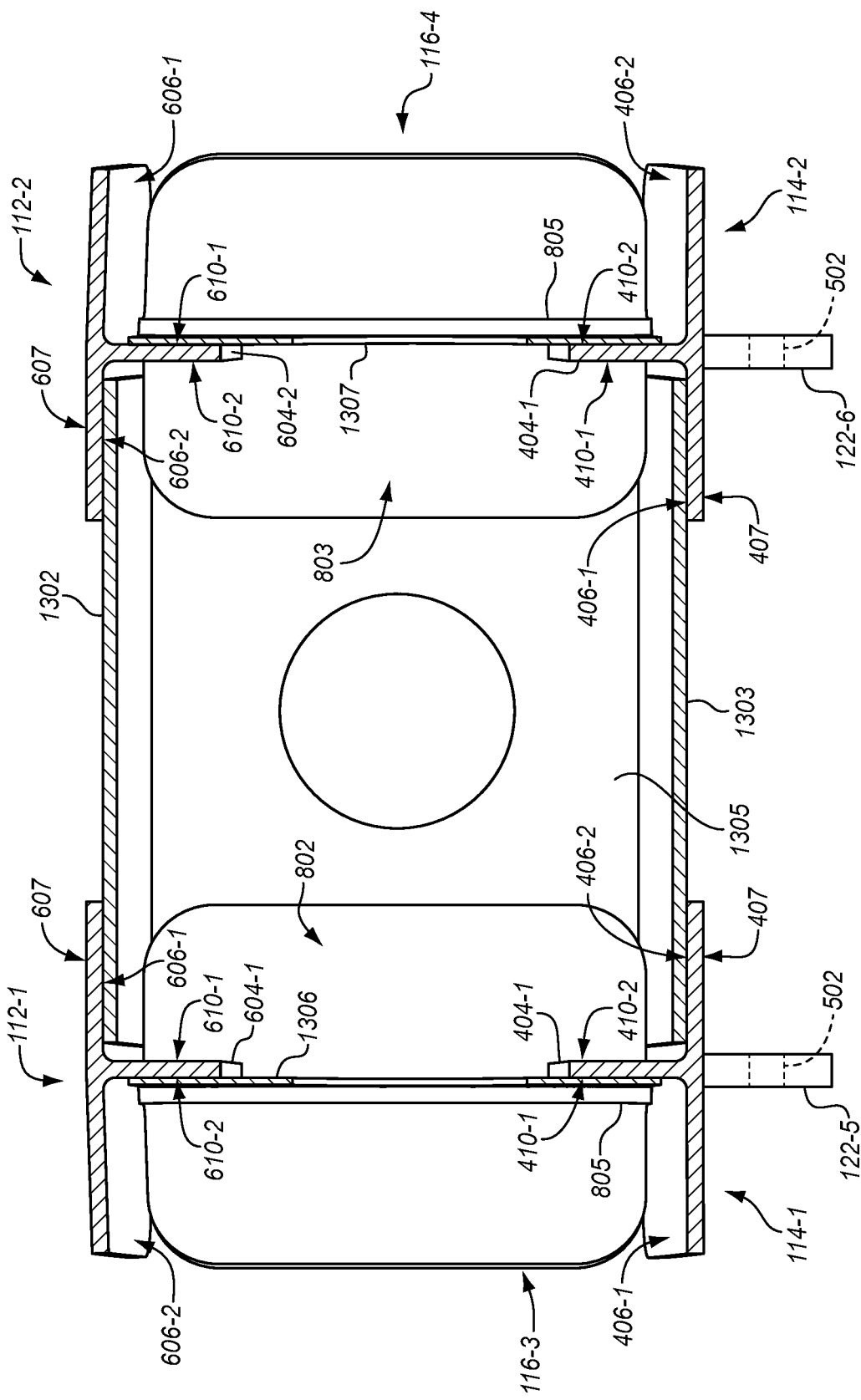
FIG. 15 is a cross-sectional view of the T-tail joint assembly of FIG. 13 in an illustrative embodiment.

FIG. 15 is a cross-sectional view of T-tail joint assembly 110 of FIG. 13 through cut-lines 1-1 in an illustrative embodiment. This view illustrates how upper panel 1302 is held in place in T-tail joint assembly 110 by surface 606-1 of upper rib chord member 112-1, planar members 802-803 along top 810 of spar fittings 116 (see FIG. 8), surface 610-1 of fin 604-1 of upper rib chord member 112-1, and surface 610-2 of fin 604-2 of upper rib chord member 112-2.

Lower panel 1303 is held in place in T-tail joint assembly 110 by surface 406-2 of lower rib chord member 114-1, planar members 802-803 of spar fittings 116, surface 410-2 of fin 404-1 of lower rib chord member 114-1, and surface 410-1 of fin 404-2 of lower rib chord member 114-2.

Rib web 1306 is held in place in T-tail joint assembly 110 by being disposed between planar member 805 of spar fitting 116-3, surface 610-2 of upper rib chord member 112-1, and surface 410-1 of lower rib chord member 114-1. Rib web 1307 is held in place in T-Tail joint assembly 110 by being disposed between planar member 805 of spar fitting 116-4, surface 610-1 of upper rib chord member 112-2, and surface 410-2 of lower rib chord member 114-2.

Rear spar web 1305 is held in place in T-tail joint assembly 110 by spar chord 304-3, and spar chord 304-4 (not shown), planar member 802 of spar fitting 116-3, and planar member 803 of spar fitting 116-4. In a similar manner, front spar web 1304 (not shown in this view) by spar chord 304-1, and spar chord 304-2, a planar member 802 of spar fitting 116-1, and planar member 803 of spar fitting 116-2.

Figure 16:
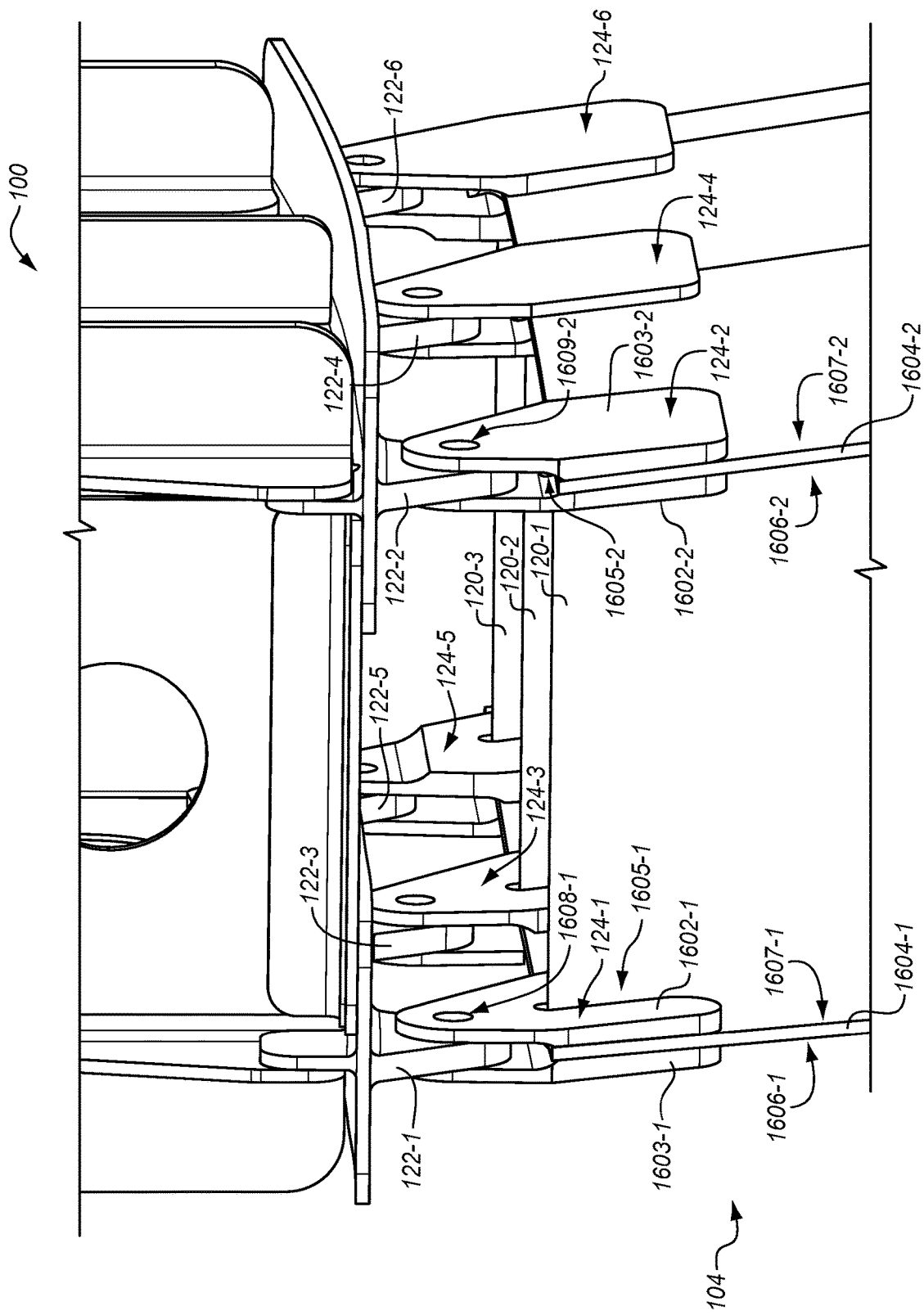
FIG. 16 is an isometric view of a portion of the T-tail empennage of FIG. 2 in an illustrative embodiment.

FIG. 16 is an isometric view of a portion of T-tail empennage 100 in an illustrative embodiment. Couplers 124 include two members 1602-1603 in this embodiment which capture spars 120 of vertical stabilizer 104 and skin panels 1604 of vertical stabilizer 104. More specifically with respect to coupler 124-1, member 1603-1 is substantially flat, and mounts to skin panel 1604-1 along surface 1606-1. Member 1602-1 is also substantially flat, and mounts to skin panel 1604-1 along surface 1607-1. Member 1602-1 includes a slot 1605-1, which captures spar 120-1. Each of members 1602-1603 includes holes 1608-1609, respectively, which align with each other and allow couplers 124 to mate with attachment members 122 in T-tail joint assembly 110. For instance, member 1602-1 of coupler 124-1 includes hole 1608-1, and member 1603-2 includes hole 1609-2.

Figure 17:
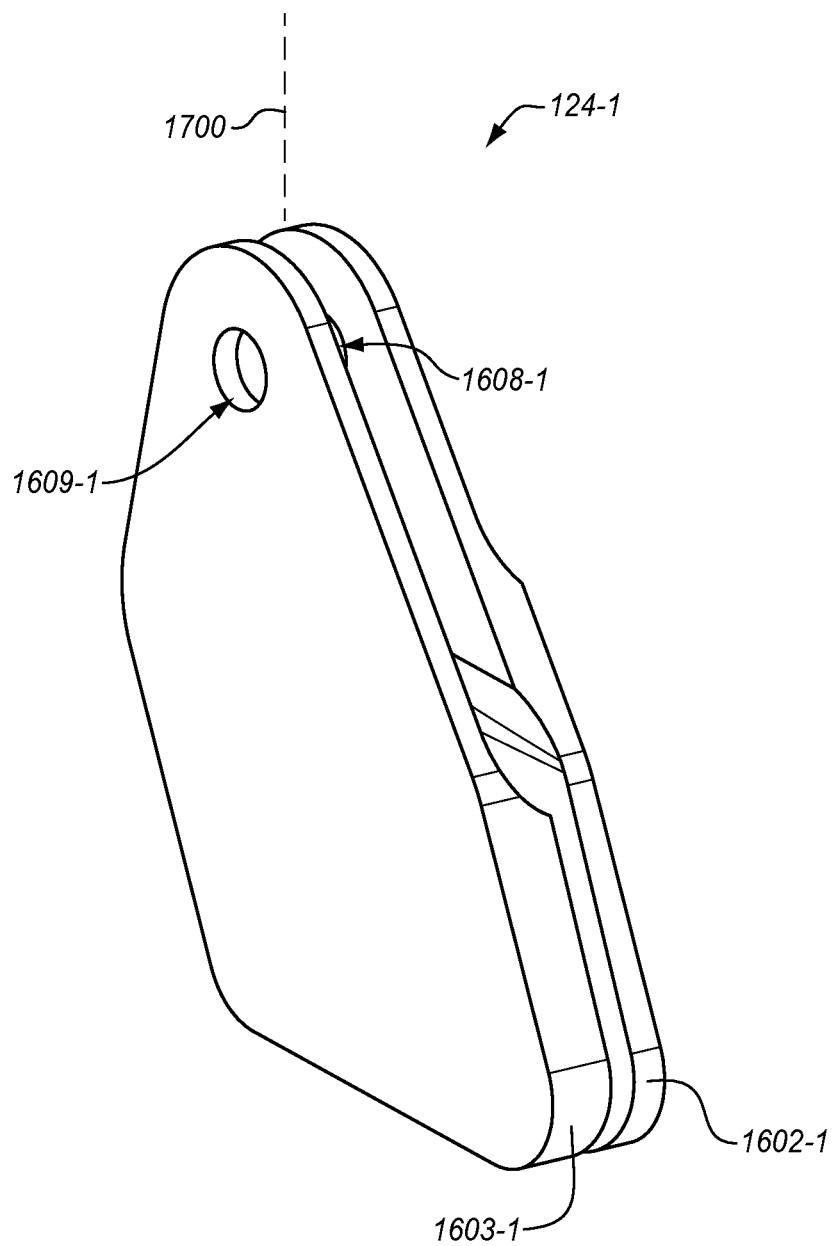
FIGS. 17-18 are isometric views of a coupler for the T-tail joint assembly rotated about an axis in an illustrative embodiment.
Figure 18:
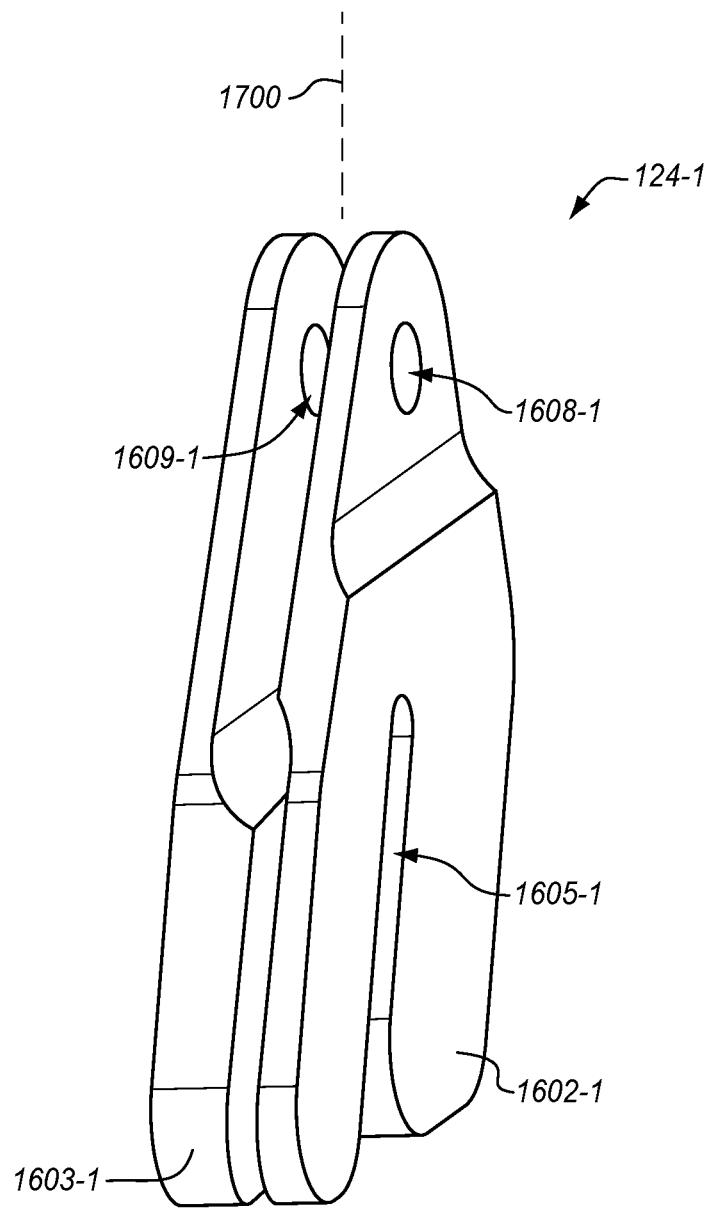

FIGS. 17-18 are isometric views of coupler 124-1 rotated about axis 1700 in an illustrative embodiment. FIG. 17 depicts hole 1609-1 of member 1603-1, and FIG. 18 depicts hole 1608-1 and slot 1605-1 in member 1602-1. After mounting coupler 124 to vertical stabilizer 104, T-tail joint assembly 110 is attached to vertical stabilizer 104 by aligning holes 502 in lower rib chord member 114 (see FIG. 5) with holes 1608-1609 in coupler 124. A pin or some other type of fastener is inserted through holes 1608-1609 of coupler 124 and hole 502 in lower rib chord member 114 to secure T-tail joint assembly 110 to vertical stabilizer 104.

Figure 19:
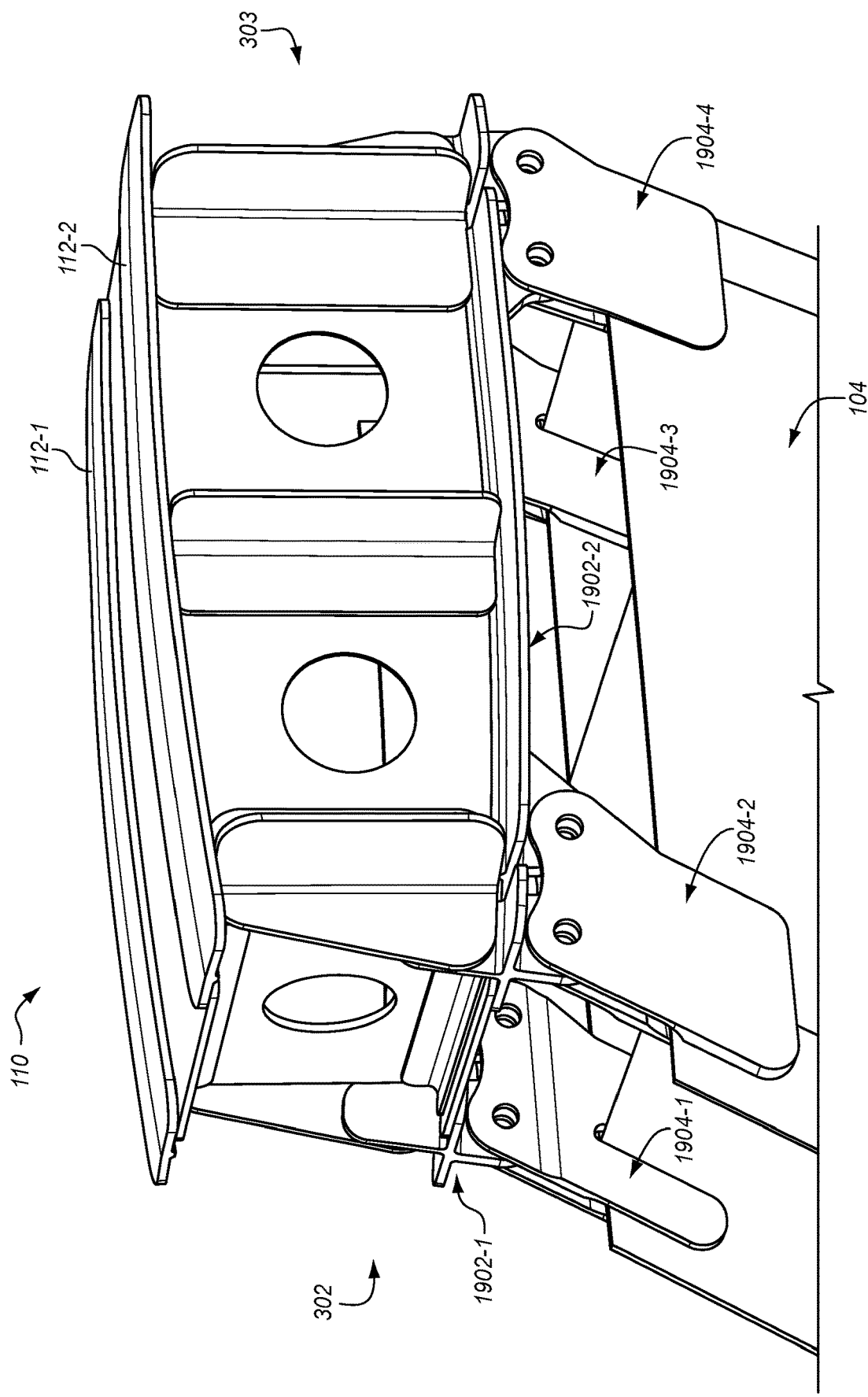
FIG. 19 is an isometric view of a T-tail joint assembly in another illustrative embodiment.

FIG. 19 is an isometric view of T-tail joint assembly 110 in another illustrative embodiment. In this embodiment, T-tail joint assembly 110 utilizes a lower rib chord member 1902 that differs from what was previously described for lower rib chord member 114 to implement an 8-lug connection between T-tail joint assembly 110 and vertical stabilizer 104, rather than the 6-lug connection previously described for T-tail joint assembly 110. This may be used to reduce cost. In this embodiment, T-tail joint assembly 110 also utilizes a coupler 1904 that differs from what was previously described for coupler 124 to support the 8-lug connection, both of which will be described below.

Figure 20:
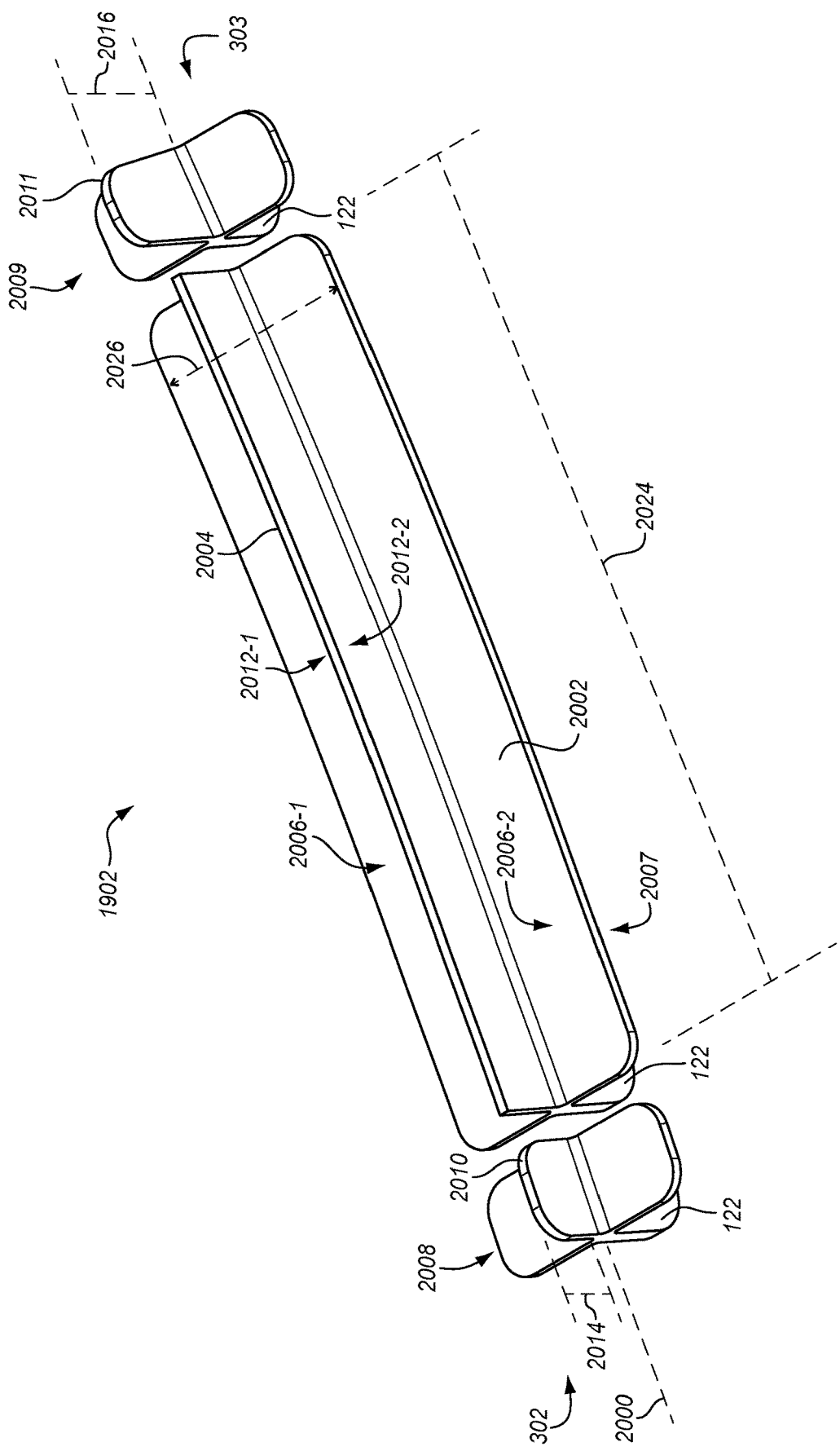
FIGS. 20-21 depict isometric views of a lower rib chord member of the T-tail joint assembly of FIG. 19 rotated about an axis in an illustrative embodiment.
Figure 21:
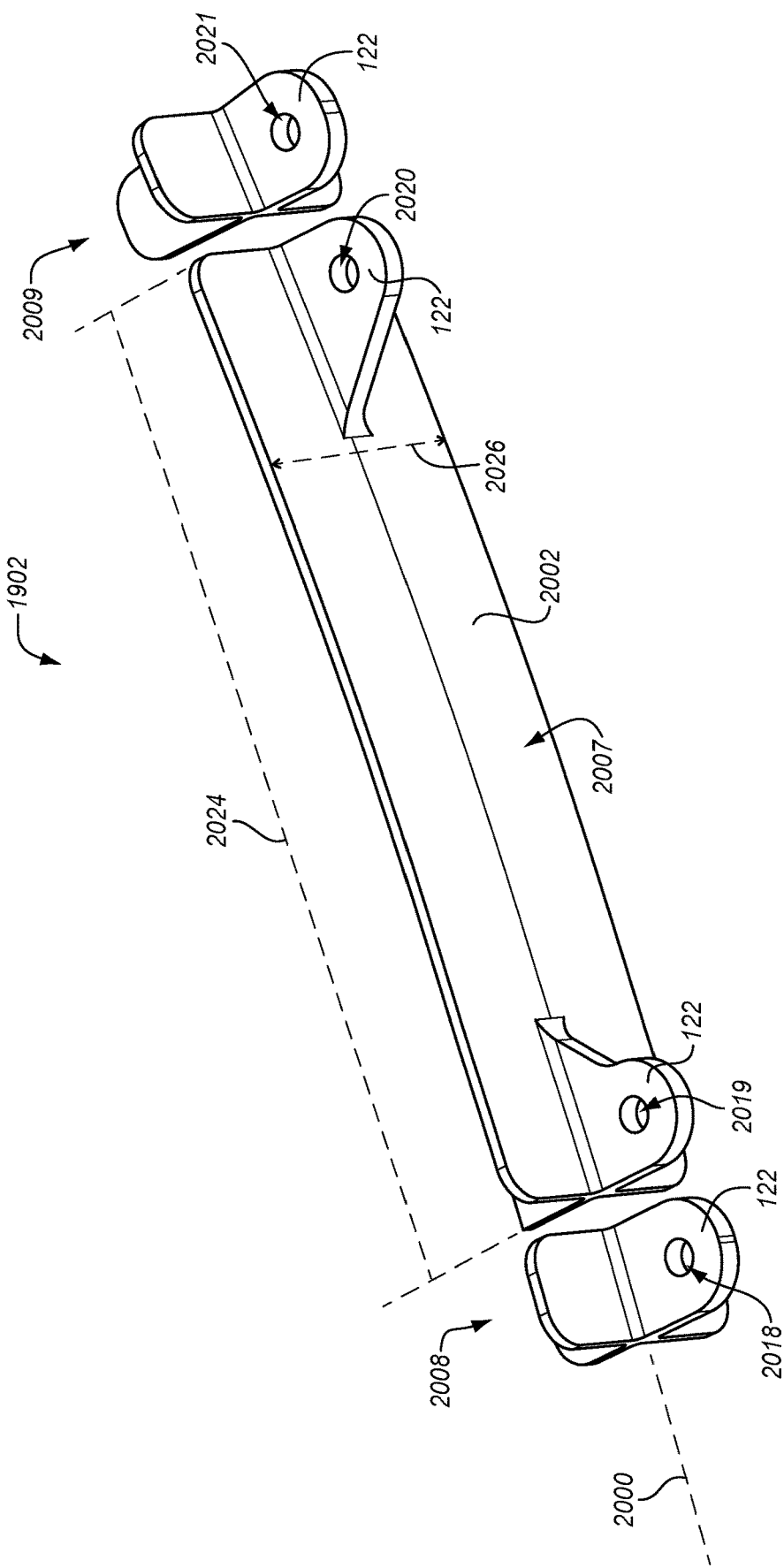

FIGS. 20-21 depict isometric views of lower rib chord member 1902 rotated about axis 2000 in an illustrative embodiment. In this embodiment, lower rib chord member 1902 includes a base member 2002 having a length 2024 and a width 2026, and a fin 2004 projecting from surfaces 2006 (i.e., surface 2006-1 and surface 2006-2) of base member 2002. The major surfaces 2012 of fin 2004 (i.e., surface 2012-1 and surface 2012-2) may form a substantially ninety-degree angle with surfaces 2006 of base member 2002. Fin 2004 is substantially centered with respect to a width 2026 of base member 2002, and extends along a length 2024 of base member 2002.

In opposition to surfaces 2006 is surface 2007, which is proximate to attachment members 122. In some embodiments, attachment members 122 are vertically aligned with fin 2004 (e.g., attachment members 122 are substantially centered with respect to width 2026 of base member 2002).

In this embodiment, lower rib chord member 1902 includes a first lower fitting 2008 having attachment member 122 and a fin 2010. Lower rib chord member 1902 further includes a second lower fitting 2009 having attachment member 122 and a fin 2011. Similar to base member 2002, attachment members 122 of first lower fitting 2008 may be vertically aligned with fin 2010, and attachment members 122 of second lower fitting 2009 may be vertically aligned with fin 2011.

Fin 2011 has a height 2016 that is higher than a height 2014 of fin 2010. This allows additional fasteners to be used on fin 2011, as spar 120-3 may carry a higher loading than spar 120-1. In this embodiment, first lower fitting 2008 includes hole 2018 in its attachment member 122, second lower fitting 2009 includes hole 2021 in its attachment member 122, and base member 2002 includes holes 2019-2020 in its attachment members 122.

Figure 22:
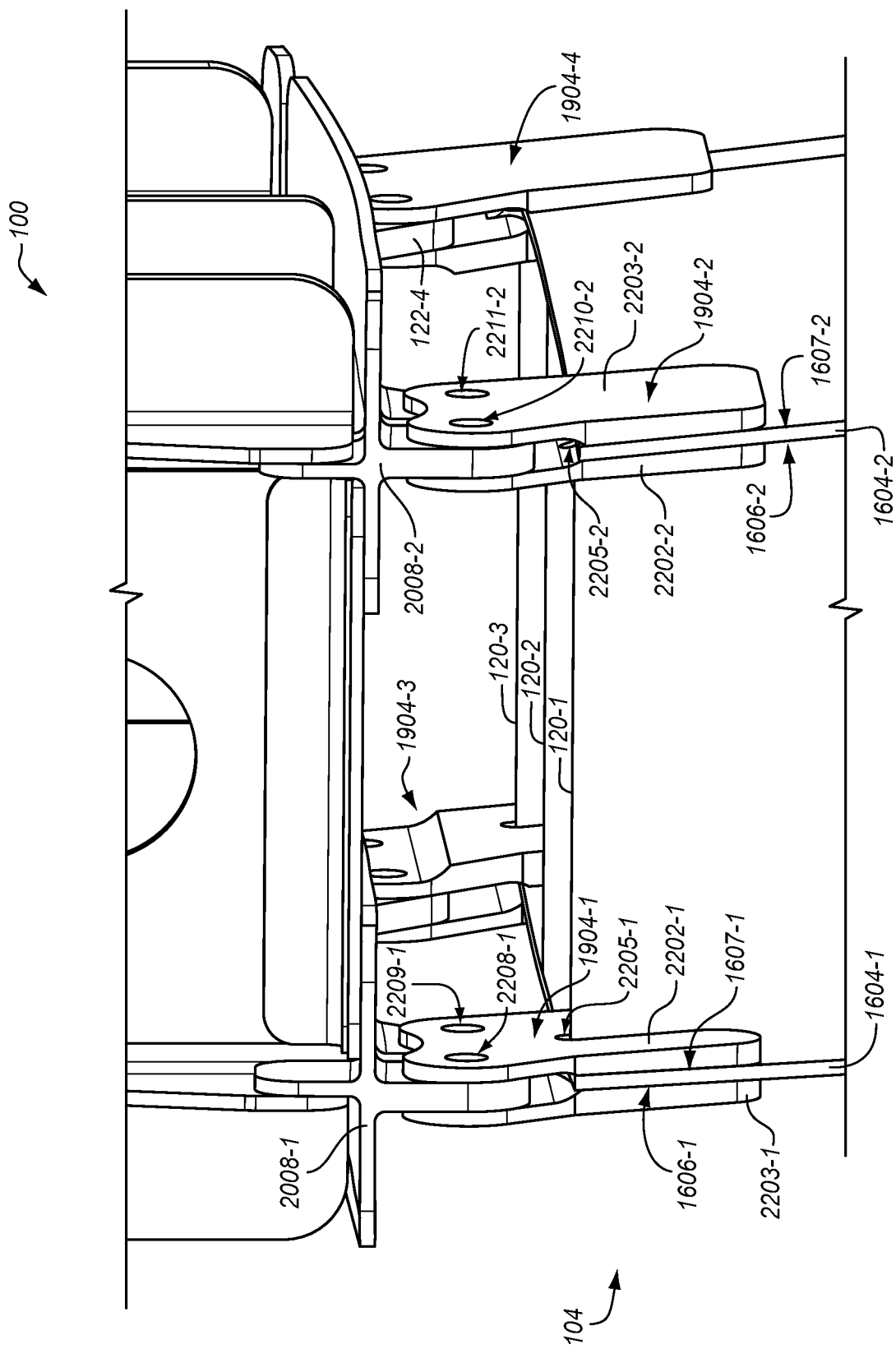
FIG. 22 is an isometric view of a portion of a T-tail empennage that utilizes the T-tail joint assembly of FIG. 19 in an illustrative embodiment.

FIG. 22 is an isometric view of a portion of T-tail empennage 100 that utilizes the T-tail joint assembly 110 of FIG. 19 in an illustrative embodiment. Couplers 1904 in this embodiment each include two members 2202-2203 which capture spars 120 of vertical stabilizer 104 and skin panels 1604 of vertical stabilizer 104. More specifically with respect to coupler 1904-1, member 2203-1 is substantially flat, and mounts to skin panel 1604-1 along surface 1606-1. Member 2204-1 is also substantially flat, and mounts to skin panel 1604-1 along surface 1607-1. Member 2204-1 includes a slot 2205-1 which captures spar 120-1.

Each of members 2202-2203 includes two holes each. For instance, member 2202-1 includes hole 2208-1 and hole 2209-1, and member 2203-2 includes hole 2210-2 and hole 2211-2. Holes 2208-2209 and holes 2210-2211 align with each other and allow couplers 1904 to mate with attachment members 122 in T-tail joint assembly 110.

Figure 23:
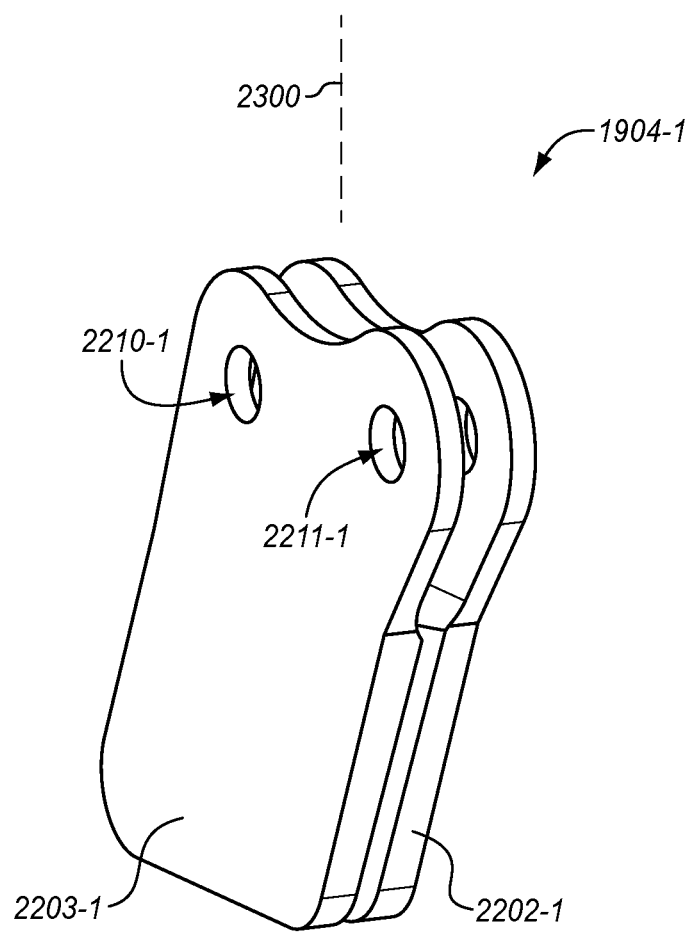
FIGS. 23-24 are isometric views of a coupler of FIG. 22 rotated about an axis in an illustrative embodiment.
Figure 24:
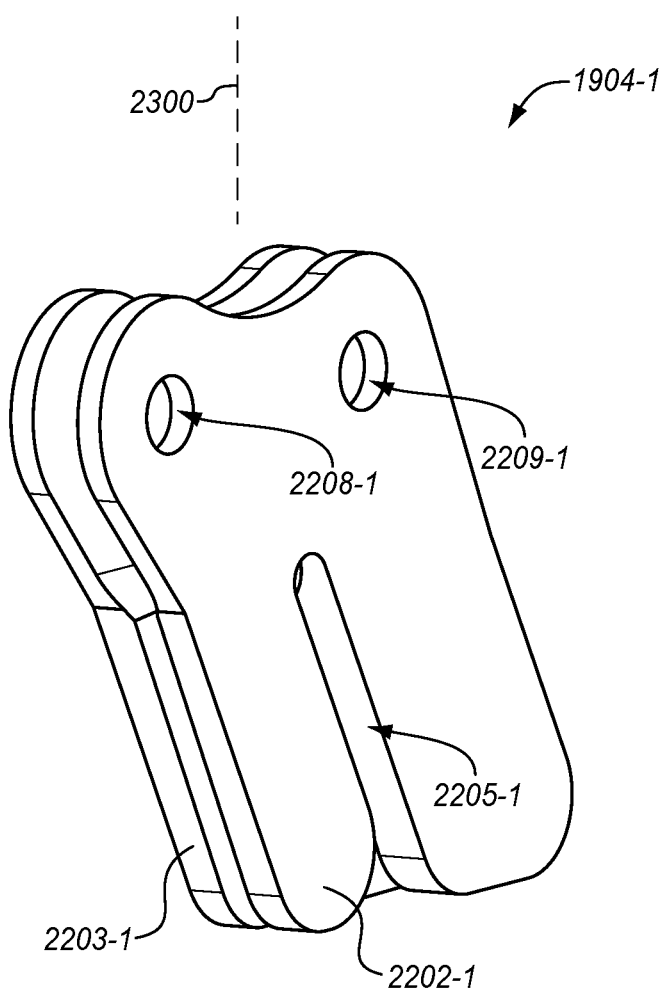

FIGS. 23-24 are isometric views of coupler 1904-1 of FIG. 22 rotated about axis 2300 in an illustrative embodiment. FIG. 23 depicts hole 2210-1 and hole 2211-1 of member 1203-1, and FIG. 24 depicts hole 2208-1, hole 2209-1, and notch 2206-1 in member 2202-1. After mounting coupler 124 to vertical stabilizer 104, T-tail joint assembly 110 is attached to vertical stabilizer 104 by aligning holes 2018-2021 in lower rib chord member 1902 (see FIG. 21) with holes 2208-2211 in coupler 1904. A pin or some other type of fastener is inserted through coupler 1904 and attachment members 122 to secure the T-tail joint assembly 110 of FIG. 19 to vertical stabilizer 104.

The use of T-tail joint assembly 110 for T-tail empennage 100 ensures a continuous load path between left horizontal stabilizer 102-1, right horizontal stabilizer 102-2, and vertical stabilizer 104, while improving the assembly process using couplers 124 or couplers 1904 that attach spars 120 and skin panels 1604 in vertical stabilizer 104 to T-tail joint assembly 110 at attachment members 122.

Although specific embodiments were described herein, the scope is not limited to those specific embodiments. Rather, the scope is defined by the following claims and any equivalents thereof

What is claimed is:
1. A T-tail joint assembly for a T-tail empennage, the T-tail joint assembly comprising:
a plurality of lower rib chord members, each having a first base member, a first fin projecting from a first surface of the first base member, notches in the first fin proximate to ends of the first base member, and attachment members projecting from a second surface of the first base member that opposes the first surface;
a plurality of upper rib chord members, each having a second base member, a second fin projecting from a surface of the second base member, and notches in the second fin proximate to ends of the second base member;
a plurality of spar fittings disposed between the upper rib chord members and the lower rib chord members, wherein the spar fittings engage the notches in the first fin of the lower rib chord members and the notches in the second fin of the upper rib chord members; and
a plurality of spar chords coupled to and separating pairs of the upper rib chord members and the lower rib chord members, wherein the plurality of spar chords is proximate to ends of the first base member and the second base member.

2. The T-tail joint assembly of claim 1, wherein:
the attachment members are vertically aligned with the first fin.

3. The T-tail joint assembly of claim 1, wherein:
the spar fittings have a cruciform shape with planar members that radiate away from each other, wherein at least two of the planar members are configured to mount spars in a horizontal stabilizer to the T-tail joint assembly.

4. The T-tail joint assembly of claim 3, further comprising:
front and rear spar webs disposed between the spar chords and major surfaces of the planar members.

5. The T-tail joint assembly of claim 4, further comprising:
rib webs disposed between major surfaces of the planar members, a major surface of the first fin, and a major surface of the second fin.

6. The T-Tail joint assembly of claim 1, further comprising:
an upper panel disposed between the surface of the second base member of the upper rib chord members and a top of the spar fittings; and
a lower panel disposed between the first surface of the first base member of the lower rib chord members and a bottom of the spar fittings.

7. The T-tail joint assembly of claim 1, further comprising:
a plurality of couplers, each configured to couple to one of the attachment members in the lower rib chord members and to at least one of a skin panel of a vertical stabilizer and a spar of the vertical stabilizer.

8. A T-tail empennage, comprising:
a left horizontal stabilizer;
a right horizontal stabilizer;
a vertical stabilizer;
a T-tail joint assembly coupling the left horizontal stabilizer and the right horizontal stabilizer to the vertical stabilizer, the T-tail joint assembly comprising:
a first lower rib chord member proximate to a lower skin panel of the left horizontal stabilizer;
a second lower rib chord member proximate to a lower skin panel of the right horizontal stabilizer, wherein each lower rib chord member comprises a first base member, a first fin projecting from a first surface of the first base member, notches in the first fin proximate to ends of the first base member, and attachment members projecting from a second surface of the first base member that oppose the first surface;

a first upper rib chord member proximate to an upper skin panel of the left horizontal stabilizer;

a second upper rib chord member proximate to an upper skin panel of the right horizontal stabilizer, wherein each upper rib chord member comprises a second base member, a second fin projecting from a surface of the second base member, and notches in the second fin proximate to ends of the second base member;

a plurality of spar fittings disposed between the first upper rib chord member and the first lower rib chord member, and disposed between the second upper rib chord member and the second lower rib chord member, wherein the spar fittings engage with the notches in the first fin of the first and second lower rib chord members and the notches in the second fin of the first and second upper rib chord members;

a plurality of spar chords coupled to and separating the first and second upper rib chord members and the first and second lower rib chord members, wherein the spar chords are proximate to the ends of the first base member and the second base member; and a plurality of couplers configured to couple to the attachment members in the first and second lower rib chord members and to at least one of spars in the vertical stabilizer and skin panels of the vertical stabilizer.

9. The T-tail empennage of claim 8, wherein:
the attachment members are vertically aligned with the first fin.

10. The T-tail empennage of claim 8, wherein:
the spar fittings have a cruciform shape with planar members that radiate away from each other, wherein at least two of the planar members are configured to mount spars in the left horizontal stabilizer and the right horizontal stabilizer to the T-tail joint assembly.

11. The T-tail empennage of claim 10, further comprising:
front and rear spar webs disposed between the spar chords and major surfaces of the planar members.

12. The T-tail empennage of claim 10, further comprising:
rib webs disposed between major surfaces of the planar members, a major surface of the first fin, and a major surface of the second fin.

13. The T-tail empennage of claim 10, further comprising:
an upper panel disposed between the surface of the second base member of the first and second upper rib chord members and a top of the spar fittings; and
a lower panel disposed between the first surface of the first base member of the first and second lower rib chord members and a bottom of the spar fittings.

14. A T-tail joint assembly for a T-tail empennage, the T-tail joint assembly comprising:
a plurality of lower rib chord members, each comprising:
a first base member, a first fin projecting from a first surface of the first base member, and attachment members projecting from a second surface of the first base member that opposes the first surface;
a first lower fitting disposed on a first side of the first base member, the first lower fitting including a second fin proximate to the first fin and an attachment member proximate to the attachment members of the first base member; and
a second lower fitting disposed on a second side of the first base member, the second lower fitting including a third fin proximate to the first fin and an attachment member proximate to the attachment members of the first base member;

a plurality of upper rib chord member, each having a second base member, a fourth fin projecting from a surface of the second base member, and notches in the fourth fin proximate to ends of the second base member;

a plurality of spar fittings disposed between the upper rib chord members and the lower rib chord members, the spar fittings engaged with the notches in the fourth fin of the upper rib chord members and engaged between the first fin and the second and third fin of the lower chord members; and a plurality of spar chords coupled to and separating pairs of the upper rib chord members and the lower rib chord members, wherein the spar chords are proximate to ends of the first base member and the second base member.

15. The T-tail joint assembly of claim 14, wherein:
the attachment members are vertically aligned with the first fin.

16. The T-tail joint assembly of claim 14, wherein:
the spar fittings have a cruciform shape with planar members that radiate away from each other, wherein at least two of the planar members are configured to mount spars in a horizontal stabilizer to the T-tail joint assembly.

17. The T-tail joint assembly of claim 16, further comprising:
front and rear spar webs disposed between the spar chords and major surfaces of the planar members.

18. The T-tail joint assembly of claim 16, further comprising:
rib webs disposed between major surfaces of the planar members, a major surface of the first fin, and a major surface of the fourth fin.

19. The T-Tail joint assembly of claim 16, further comprising:
an upper panel disposed between the surface of the second base member of the upper rib chord members and a top of the spar fittings; and
a lower panel disposed between the first surface of the first base member of the lower rib chord members and a bottom of the spar fittings.

20. The T-tail joint assembly of claim 14, further comprising:
a plurality of couplers, each configured to couple to one of the attachment members in the lower rib chord members to at least one of a skin panel of a vertical stabilizer and a spar of the vertical stabilizer.

* * * * *